(12) United States Patent
Horan et al.

(10) Patent No.: US 7,970,567 B2
(45) Date of Patent: *Jun. 28, 2011

(54) SELF CALIBRATING CABLE FOR A HIGH DEFINITION DIGITAL VIDEO INTERFACE

(75) Inventors: John Martin Horan, Blackrock (IE); John Anthony Keane, Douglas (IE); Gerard David Guthrie, Corofin (IE)

(73) Assignee: Redmere Technology Ltd., Balbriggan, Dublin (IE)

( * ) Notice: Subject to any disclaimer, the term of this patent is extended or adjusted under 35 U.S.C. 154(b) by 452 days.

This patent is subject to a terminal disclaimer.

(21) Appl. No.: 12/219,642

(22) Filed: Jul. 25, 2008

(65) Prior Publication Data

US 2009/0030635 A1  Jan. 29, 2009

Related U.S. Application Data

(60) Provisional application No. 60/935,080, filed on Jul. 25, 2007.

(51) Int. Cl.
*G06F 19/00* (2006.01)
*H04N 17/00* (2006.01)

(52) U.S. Cl. ........................................ 702/107; 348/192

(58) Field of Classification Search .................. 702/107, 702/57, 66, 69, 79, 81, 84–85, 89–90, 108, 702/110, 117, 124–125, 176, 182–183, 188; 348/180–181, 192, E17.001; 327/67, 72–73, 327/362; 333/1, 17.3, 28 R, 32, 100, 124
See application file for complete search history.

(56) References Cited

U.S. PATENT DOCUMENTS

| | | | |
|---|---|---|---|
| 6,393,110 B1 | 5/2002 | Price | |
| 7,565,530 B2 | 7/2009 | Kwak | |
| 7,617,064 B2 * | 11/2009 | Stakely et al. | 702/117 |
| 7,680,840 B2 | 3/2010 | Jung | |
| 7,706,692 B2 | 4/2010 | Tatum | |
| 7,728,223 B2 | 6/2010 | Shintani | |
| 7,762,727 B2 | 7/2010 | Aronson | |
| 2002/0143485 A1 | 10/2002 | Chen | |
| 2002/0159548 A1 | 10/2002 | Evans | |
| 2004/0081231 A1 | 4/2004 | Kim | |
| 2004/0081232 A1 | 4/2004 | Scott | |
| 2004/0161070 A1 | 8/2004 | Yin | |
| 2005/0073608 A1 | 4/2005 | Stone | |

(Continued)

OTHER PUBLICATIONS

Sreerama, C., Effects of Skew on EMI for HDMI Connectors and Cables, 2006, International Symposium on Electromagnetic Compatibility, vol. 2, pp. 452-455.*

(Continued)

*Primary Examiner* — Michael P Nghiem
*Assistant Examiner* — Toan M Le

(57) ABSTRACT

An HDMI cable may exhibit frequency dependent signal attenuation, inter symbol interference, and inter-pair skew. A boost device integrated with the cable can compensate for such impairments of the cable. A self calibrating cable with a boost device of the embodiment of the invention is described, in which parameters that control the response of the boost device are set optimally in a self-calibrating process comprising looping the boosted cable on itself through a calibration fixture that contains a calibration control device. The boost device includes pattern generators and a sampling circuit. Each high speed channel of the cable is separately tested and calibrated with the help of one of the other channels serving as a sampling channel.

37 Claims, 15 Drawing Sheets

U.S. PATENT DOCUMENTS

| | | |
|---|---|---|
| 2005/0132087 A1 | 6/2005 | Glinski |
| 2006/0239310 A1 | 10/2006 | Salz |
| 2007/0164802 A1 | 7/2007 | Rea |
| 2008/0151116 A1* | 6/2008 | Wang et al. .................. 348/515 |
| 2009/0290026 A1* | 11/2009 | Horan et al. .................. 348/181 |

OTHER PUBLICATIONS

Razavi, Behzad "Design of analog CMOS Integrated Circuits", published by McGraw-Hill, New York, 2001.

Favrat et al, "A High-Efficiency CMOS Voltage Doubler", IEEE J. Solid State Circuits, vol. 33, No. 3, pp. 410-416, Mar. 1998.

TDK Semiconductor Corp.,"78P2341JAT E3/DS3/STS-1 LIU with Jitter Attenuator" Aug. 2003,http:/datasheet.digchip.com/471/471-391-0-78P2341JAT.pdf.

HDMI (High Definition Multimedia Interface) specification version 1.3 dated Jun. 22, 2006 published by HDMI Licensing, LLC.

Long Reach, Product description from Gennum Corporation, www.grnnum.com/ip/pdfiles/gs8101.pdf, p. 1-2, 2006.

HDMI Super Booster, Manual for the Standalone HDMI "SUper Booster" from Gefen Inc., http://www.gefen.com/pdf/EXT-HDMI-141SB.pdf, published in 2006.

Afshin Rezayee and Ken Martin. "A 10-Gb/s Clock Recovery Circuit with Linear Phase Detector and Coupled Two-Stage Ring Oscillator" published at the European Solid State Circuits Conference (SSCIRC) in Florence, Italy, 2002, pp. 419-422.

HDMI Super Booster Cables, an advertisement for a cable with integrated HDMI "super booster" from Gefen Inc. published at http://www.gefen.com, 2006.

* cited by examiner

SELF CALIBRATING CABLE FOR A HIGH DEFINITION DIGITAL VIDEO INTERFACE

RELATED APPLICATIONS

The present invention claims benefit from the U.S. provisional application Ser. No. 60/935,080 to Horan, John et al. filed on Jul. 25, 2007 entitled "Circuits and Methods for Gigabit Data Recovery and Digital Repeater Implementation", which is incorporated herein by reference.

FIELD OF THE INVENTION

The present invention relates to high speed cables that carry serially encoded differential signals between electronic equipments, and in particular, multi-conductor cables with embedded boost devices for interconnecting audio-visual equipment.

BACKGROUND OF THE INVENTION

The distribution of television signals has increasingly become based on digital methods and digitally encoded forms of video and audio signals. At the same time, higher resolution (high definition TV) has become available in the market place, commensurate with larger and higher definition displays. To meet the requirement of interconnecting such high definition displays with digital signal sources such as Digital Versatile Disc (DVD) players and receivers/decoders for digital satellite and digital cable distribution of video material, a digital interface standard has evolved, known as the High-Definition Multimedia Interface (HDMI). A detailed specification for HDMI can be obtained from the "hdmi.org" website. The HDMI specification currently available and used in this application is HDMI specification version 1.3 dated Jun. 22, 2006, which is incorporated herein by reference. This HDMI standard can be employed for connecting digital video sources to digital video sinks over a cable that carries a number of digital signals and a clock signal.

The inherent characteristics and manufacturing imperfections of high-speed differential signaling cables such as may be used to carry HDMI signals have an adverse effect on the high-speed signals carried by the cable.

For example, any cable has a limited bandwidth and therefore acts as a low pass filter. The bandwidth of the cable is related to its length, the longer the cable the greater the filtering effect and the lower its bandwidth. As a result, high-frequency signals passing through the cable are attenuated, and their edges become less sharp. This leads to an increased risk of misinterpreting the received data at the receiver end of the cable, especially for long cables and high-speed data.

Previously filed patent applications of the applicant, all of which are incorporated herein by reference, Ser. No. 11/826,713 "A High-Speed Cable With Embedded Power Control", now U.S. Pat. No. 7,861,277, Ser. No. 11/826,716 "A Programmable High-Speed Cable With Boost Device", Ser. No. 11/826,710 "A Programmable High-Speed Cable With Printed Circuit Board And Boost Device", Ser. No. 11/826,711 "A Programmable Cable With Deskew And Performance Analysis Circuits", and Ser. No. 11/826,712 "System And Method for Calibrating A High-Speed Cable", now U.S. Pat. No. 7,729,874, all of which were filed on Jul. 18, 2008, have described an HDMI cable that includes a boost device.

FIG. 1 shows an HDMI system 10 including an improved HDMI cable 20 of the prior art. The HDMI system 10 includes an HDMI transmitter Tx (HDMI Source Device), an HDMI receiver Rx (HDMI Sink Device), and the improved HDMI cable 20 connecting the Tx to the Rx.

The improved HDMI cable 20 comprises an embedded boost device 30 and a basic (passive) HDMI cable 40. The boost device 30 is located near the end of the improved HDMI cable 20 closest to the HDMI receiver Rx. The improved HDMI cable 20 may be used to connect a DVD player to a Television Screen for example, or in general connect any HDMI Source Device to an HDMI Sink Device.

FIG. 2 shows a block diagram of circuits that are included in the boost device 30 of the HDMI system 10 of FIG. 1 of the prior art. The boost device 30 includes a number of channel boost circuits 100, and a parameter memory 102. Typically, the boost device 30 includes four (4) channel boost circuits 100, each to boost the signal of one of the TMDS Channel 0, the TMDS Channel 1, the TMDS Channel 2, and the Clock Channel. These four channels are high speed digital channels as described in the HDMI specification.

Each channel boost circuit 100 includes an HDMI Input Circuit 106 and an HDMI Output Circuit 108. Each channel boost circuit 100 may further include a Differential (intra-pair) Deskew Circuit 110 for adjusting an existing time skew of the two polarities of a differential data signal propagating through the basic HDMI cable 40 and an Equalizer Circuit 112 to compensate for the limited bandwidth characteristics of the basic HDMI cable 40. Each channel boost circuit thus provides a transfer function from the respective HDMI Input to the corresponding HDMI Output with characteristics designed to compensate for the degradation of the corresponding differential pair in basic cable 40.

The improved HDMI cable 20 comprising four boost circuits may be manufactured with any of a number of different lengths of the basic (passive) HDMI cable 40. To compensate for the differential skew and the frequency response of each individual cable, methods have been proposed in the above mentioned previous patent application Ser. No. 11/826,712 "System And Method For Calibrating A High-Sped Cable", now U.S. Pat. No. 7,729,874, for calibrating the Differential Deskew Circuit 110 and the Equalizer Circuit 112 through digital parameters stored in the parameter memory 102. The Parameter Memory 102 may be loaded with parameter values at the time of manufacture of the improved HDMI cable 20.

Three alternative methods have been proposed for calibrating the parameters: a Real Time Calibration method; a Frequency Domain Calibration method; and a Time Domain Calibration method. Because the physical cable is fairly stable, it is not necessary to dynamically adjust these parameters in the field, once they have been set originally, although the Real Time Calibration method could certainly be adapted to perform this.

The Frequency Domain and Time Domain Calibration methods require expensive external test equipment while the Real Time Calibration method additionally relies on an external HDMI data generator and a sophisticated performance analysis circuit built into the boost device 30.

FIG. 3 shows a generic test set up 200 for Frequency Domain and Time Domain Calibration methods of the prior art. The generic test set up 200 includes the improved HDMI Cable 20 (see FIG. 1), a PC 202, and a test equipment 204 that is either a VNA (Vector Network Analyzer) or a TDR (Time Domain Reflectometer). The PC 202 is attached to the control bus (SDA+SCL) of the basic HDMI Cable 40. The test equipment 204 is connected to the differential channels at both ends of the cable, that is the four differential channel inputs (8 wires) 208 and the four differential channel outputs (8 wires) 210 that are carrying the boosted signal.

The test equipment 204 is controlled by the PC 202 over a standard PC-interface 206 to send stimulus signals into the cable inputs (208) and to receive measurement results from the cable outputs (210). The results are passed back to the PC 202 over the standard PC-interface 206 for evaluation.

It is possible with the test equipment 204 being either a VNA or a TDR to obtain both frequency attenuation and delay characteristics of the cable, although well-known mathematical transformations are required to convert between the frequency and time domain results obtained with the VNA or the TDR respectively.

FIG. 4 shows a Real Time Configuration 300 used in a Real Time Cable Calibration method of the prior art. The Real Time Configuration 300 includes a Real Time Test Equipment 302 and the improved HDMI cable 20 of FIG. 1, which however includes an expanded boost device 304. The expanded boost device 304 includes the boost device 30 (FIG. 2) and additional circuitry for analyzing the boosted signal (210) and providing access to the control bus (SDA+SCL).

The Real Time Test Equipment 302 includes a +5V Supply to supply power to the cable; a Data Pattern Generator for generating HDMI-conforming differential data and clock signals to feed into the differential channel inputs (208), and a Control Computer (PC) to control the data patterns to be output by the Data Pattern Generator, and to communicate with the expanded boost device 304 in the cable over the control bus (SDA+SDL). A termination device "Term" that comprises a set of typical differential termination circuits is connected to the differential channel outputs 210.

To calibrate the cable (each cable is individually calibrated at production) the Real Time Calibration method may include the following steps:

a control program in the PC instructs the Data Pattern Generator to send HDMI data patterns into the differential channel inputs 208 of the cable;

the control program in the PC uses the control bus (SDA+SDL) to send deskew and equalization parameters to the expanded boost device 304;

the expanded boost device 304 performs the deskew and equalization steps as determined by the set parameters;

the expanded boost device 304 analyzes the quality of the deskewed and equalized signal;

the expanded boost device 304 reports the quality result to the PC over the control bus (SDA+SDL);

the preceding steps are repeated for each differential channel and with different parameters;

the best settings are determined and permanently set into the parameter memory 102 within the boost device 30.

FIG. 5 shows a simplified block diagram of the expanded boost device 304 of the prior art, including the boost device 30, a Control Interface 306, and a performance analysis circuit 308. Only a representative one of the four channel boost circuits 100 is shown in the FIG. 5, it being understood that each of the three differential TMDS channels and the differential clock channel are processed by a respective channel boost circuits 100.

The Control Interface 306 communicates with the Real Time Test Equipment 302 of FIG. 4 over the control bus SDA+SCL, and with the parameter memory 102 (in the boost device 30) over a parameter setup link 310.

The performance analysis circuit 308 is only active (powered up under control of the Control Interface 306) when the expanded boost device 304 is being calibrated.

The performance analysis circuit 308 includes a Differential-to-Single-Ended block 312, a Linear Phase Compensator 314, an Oversampling and Reclocking block 316, and a Training Function block 318. An output of the Training Function block 318 is connected to an input of the Control Interface 306 over a control link 320. Two optional outputs (parameter links 322) of the Training Function block 318 are connected to deskew and equalization parameter inputs 324 and 326 of the channel boost circuit 100, bypassing the Parameter Memory 102.

Not shown in FIG. 5 is a conventional clock recovery circuit which recovers the clock from any of the differential channels, and generates a multiphase clock signal (clock phases PH0 to PH23). The generation of the multiphase clock signal may be accomplished with a phase locked loop using any of a number of known techniques to generate multiple phases of a clock.

When each of the four channel boost circuits 100 is to be calibrated by the Real Time Cable Calibration method, its "boosted signal" pair 124 is tapped and connected to the performance analysis circuit 308.

Note that a single common performance analysis circuit 308 may be shared for calibrating the four channel boost circuits 100 sequentially. Alternatively, a plurality of performance analysis circuits 308 may be included in the expanded boost device 304 which would allow the channel boost circuits 100 to be calibrated in parallel.

In the performance analysis circuit 308 the "boosted signal" pair 124 is connected to the Differential-to-Single-Ended block 312 which converts the boosted signal 124 into a single-ended signal 328 that is input to the Linear Phase Compensator 314 which also receives the PH0 phase of the multiphase clock signal, and produces as output a phase aligned signal 330.

The Oversampling and Reclocking block 316 receives the phase aligned signal 330 as well as all 24 phases (PH0 to PH23) of the multiphase clock signal, to generate a 24-sample digital samples signal 332 which is then input to the Training Function block 318.

After being converted to the single-ended signal 328 in the Differential-to-Single-Ended block 312, the data is ready to be sampled (converted into a digital signal). To define the phase relationship between the on-board clock (PH0 of the multi-phase clock) and the data (the single ended signal 328), an Analog Phase detector (within the Linear Phase Compensator 314) is used. The frequency of the data and the recovered clock are equivalent because the timings in both are derived from the same source, that is, the transmitted clock, so there is no need for frequency adjustment. The Linear Phase Compensator 314 may be based on a scheme described in the paper entitled "A 10-Gb/s Clock Recovery Circuit with Linear Phase Detector and Coupled Two-stage Ring Oscillator" by Afshin Rezayee and Ken Martin. This paper, which is incorporated herein by reference, was published at the European Solid State Circuits Conference (SSCIRC) in Florence, Italy in the year 2002, pp. 419-422.

The phase aligned (data) signal 330 is a rail-to-rail analog signal that may still contain Inter Symbol Interference (ISI), distortion, noise, and other impairments. In the Oversampling and Reclocking block 316, this signal is effectively sampled at a rate 12 times the clock rate of the signal, i.e. during each bit period the data signal is sampled at 12 evenly spaced intervals, to generate 12 digital samples. Because of the high speed of the signal (typically 1.65 Gbs) it is not practical to actually sample the signal with a 12-times higher clock signal. Instead, the same effect is achieved by sampling the signal with 12 evenly spaced phases of the clock signal, each clock phase generating a digital sample, thus 12 samples representing one data bit. As described in the above cited patent application Ser. No. 11/826,713, now U.S. Pat. No. 7,861,277, and Ser. No. 11/826,716, 24 clock phases (PH0 to PH23 of the multiphase clock signal) are used to capture not only one data bit in 12 sampling phases, but also the trailing half of the previous data bit in 6 sampling phases and the leading half of the next data bit in another 6 sampling phases. Conventional digital register logic and pipelining is used to thus look into the "future".

Thus, the Oversampling and Reclocking block 316 generates 24 samples (a "24-sample word") at the bit-clock rate, by outputting the 24-sample digital samples signal 332.

FIG. 6 illustrates with a diagram 400 an example of oversampling in the Oversampling and Reclocking block 316 of FIG. 5. The diagram 400 in FIG. 6 shows an exemplary waveform 402, a delayed waveform 404, a set of sampling clocks 406, a 24-sample word 408, and a scale indicating a bit-period and previous and next bits.

The exemplary waveform 402 represents an example of the single ended signal 328 (FIG. 5) before phase alignment. Note that the signal appears to be a "1" bit with some distortion (noise or ISI) near the one-zero transition, and it is not aligned with the indicated bit-period. The delayed waveform 404 represents the corresponding phase aligned signal 330 after delay through the Linear Phase Compensator 314. Note that the signal is now approximately aligned with the indicated bit-period, but still includes the distortion. This signal is sampled with the 24 phases of the multiphase clock (PH0 to PH23) as indicated by the set of sampling clocks 406 in the Oversampling and Reclocking block 316, resulting in the 24-sample word 408. The 24-sample word 408 includes six samples (000000) from the previous bit period, twelve samples (111111111100) from the Bit-period and another six samples (000000) from the next bit period.

The 24-sample word 408 is output by the Oversampling and Reclocking block 316 as the 24-sample digital samples signal 332 to the Training Function 318.

The Training Function 318 (FIG. 5) may provide feedback to the Real Time Test Equipment 302 (FIG. 4) by evaluating the 24-sample digital samples signal 332, which is a stream of 24-sample words such as illustrated in the 24-sample word 408 of FIG. 6. In this way, the Real Time Test Equipment 302 may be able to tune the adjustable parameters of the channel boost circuit 100 that is presently being calibrated.

In another approach the Training Function 318 may systematically go through each of the possible permutations of settings of these parameters; observe and measure the quality of the preprocessed signal (the single ended signal 328 that is oversampled as the 24-sample digital samples signal 332) to obtain a quality measure in the form of a "Quality Number"; and retain the settings that yield the best Quality Number in the parameter memory 102 (FIG. 5).

Although the Real Time Calibration method could be conducted under step by step control through the PC, it may be advantageous to allow the Training Function 318 to bypass the Parameter Memory 102 and perform repetitive steps of setting trial values of the parameters (126 and 128) autonomously, and only report the final result for each channel to the PC which may then load the "best" settings into the Parameter Memory 102.

Alternatively, the PC may be used only to start the Real Time Calibration, the final results (the "best setting") being autonomously loaded into the parameter memory without intervention by the PC.

In the calibration methods of the prior art described above, access to the boost device for controlling the calibration process that includes setting parameters in the boost device, is provided over the control bus comprising "Serial Data" (SDA) and "Serial Clock" (SCL), typically from a control computer (PC). Furthermore, test equipment in the form of a Vector Network Analyzer, a Time Domain Reflectometer, or a high-speed data pattern generator is needed to stimulate the differential high-speed HDMI channels for the calibration. And in the Real Time Calibration method, a complex high-speed oversampling circuit and quality evaluation circuit is built into the expanded boost device 304.

A more economical calibration method for boosted HDMI cables is required in terms of calibration equipment cost, and time to set up the calibration process.

SUMMARY OF THE INVENTION

Therefore there is an object of the invention to provide an improved self calibrating cable for a high definition digital video interface and a method for calibrating the cable.

According to one aspect of the invention, there is provided a system for calibrating a boost device embedded in a high speed cable including a plurality of high speed channels, a low speed control bus, an input connector, and an output connector, the system comprising:

a calibration fixture including a feed-through connection for looping the high speed channels from the output connector to the input connector; and a calibration control device, connected to the low speed control bus, for calibrating the high speed channels.

In the system described above, the high speed cable is a High-Definition Multimedia Interface (HDMI) cable.

The boost device comprises:

a plurality of channel circuits, each for boosting a corresponding one of the high speed channels, each channel circuit including a pattern generator and a programmable boost circuit responsive to programmable parameters;

a low speed control bus interface, interfacing the low speed control bus for controlling the pattern generator of each channel circuit;

a sampling circuit for sampling outputs of the programmable boost circuits; and a sampling control circuit for monitoring the sampling circuit and for setting the programmable parameters.

In the system described above, each channel circuit further comprises a multiplexer for alternatively selecting an output of the programmable boost circuit in a mission mode or the pattern generator in a calibration mode, the mission mode corresponding to an ordinary use of the high speed cable, and the calibration mode being reserved for the calibrating of the boost device.

In the system described above, the sampling circuit comprises:

a programmable delay for delaying an output of a first selected one of the programmable boost circuits;

a sampling circuit element for generating samples from an output of a second selected one of the programmable boost circuits clocked with the delayed output of the first selected one, wherein the samples have values of "0" and "1"; and a means for determining an average of the values of N generated samples.

Conveniently, the sampling circuit element comprises a flip flop.

The means for determining the average comprises a counter for counting instances of the generated samples having the same value.

The sampling control circuit comprises:

a means for varying the programmable delay in predetermined delay steps and determining the average of N generated samples for each delay step; and a memory for storing the average after each delay step.

The calibration control device comprises means for interpolating between the predetermined delay steps by using the stored averages.

The means for varying comprises a delay step counter for controlling the programmable delay, and a divide-by-N counter for incrementing the delay step counter to the next step after N samples have been collected.

The calibration control device may be a micro controller, or a field programmable array.

According to another aspect of the invention, there is provided a boost device coupled to a high speed cable that includes a plurality of high speed channels and a low speed control bus, the boost device including:

a plurality of channel circuits, each for boosting a corresponding high speed channels of the high speed cable, each channel circuit including a pattern generator and a programmable boost circuit responsive to programmable parameters;

a low speed control bus interface for controlling the pattern generator of each channel circuit;

a sampling circuit for sampling outputs of the programmable boost circuits; and a sampling control circuit for monitoring the sampling circuit and for setting the programmable parameters.

In the embodiment of the invention, the high speed cable is a High-Definition Multimedia Interface (HDMI) cable.

In the boost device described above, each channel circuit further comprises a multiplexer for alternatively selecting an output of the programmable boost circuit in a mission mode or the pattern generator in a calibration mode, the mission mode corresponding to an ordinary use of the high speed cable, and the calibration mode being reserved for the calibrating of the boost device.

In the boost device described above, the sampling circuit comprises:

a programmable delay for delaying an output of a first selected one of the programmable boost circuits;

a sampling circuit element for generating samples from an output of a second selected one of the programmable boost circuits clocked with the delayed output of the first selected one, wherein the samples have values of "0" and "1"; and a means for determining an average of the values of N generated samples.

In the boost device described above, the sampling control circuit including:

a means for varying the programmable delay in predetermined delay steps and determining the average of N generated samples for each delay step; and a memory for storing the average after each delay step.

According to another aspect of the invention, there is provided a method for calibrating a boost device embedded in a high speed cable that carries a plurality of high speed channels and a low speed control bus, and includes an input connector and an output connector, the method comprising:

(a) looping the high speed channels from the output connector to the input connector;

(b) selecting a test channel from among the high speed channels;

(c) selecting a sampling channel from among the remaining high speed channels;

(d) calibrating the test channel; and (e) repeating the steps (b) to (d) until all high speed channels are calibrated.

20. The method of claim 19, wherein the step (d) comprises:

(f) selecting and setting a parameter set of the boost device;

(g) testing the test channel with the selected parameter set to obtain a pulse width error that is indicative of the performance of the boost device, a lower error indicating better performance;

(h) selecting a different parameter set; and (i) repeating the steps (g) and (h) until the pulse width error is minimized.

The step (g) comprises:

(j) sending a repetitive test pattern including a transmitted pulse over the test channel;

(k) sending a repetitive sampling pattern synchronized with the repetitive test pattern over the sampling channel;

(l) receiving a received test pattern and a received sampling pattern through the looped cable from the test channel and the sampling channel respectively;

(m) sampling the received test pattern with the received sampling pattern to obtain relative times of rising and falling edges of a received pulse of the received test pattern;

(n) computing a pulse width of the received pulse from the difference of the relative times; and (o) computing the pulse width error as the absolute difference between the pulse widths of the transmitted pulse and the received pulse.

The step (m) comprises:

(p) delaying the received sampling pattern by programmable delay value to obtain a delayed sampling pulse;

(q) sampling the received test pattern with the delayed sampling pulse N times to yield "0" and "1" samples;

(r) counting the samples, which have the same value, to produce a count;

(s) saving the count and the delay value in a memory;

(t) repeating the steps (p) to (s) for different delay values;

(u) computing the relative times of rising and falling edges from the saved delay values and the saved counts.

Preferably, N is greater than 8.

According to yet another aspect of the invention, there is provided a method of estimating a position in time of a pulse edge in a received signal by using a sampling pulse, the method comprising:

(1) delaying the sampling pulse by a programmable delay value to obtain a delayed sampling pulse;

(2) sampling the received signal with the delayed sampling pulse N times to yield "0" and "1" samples;

(3) counting the samples, which have the same value, to produce a count;

(4) saving the count and the delay value in a memory; (5) repeating the steps (1) to (4) for different delay values;

(6) computing the position in time of the pulse edge from the saved delay values and the saved counts.

In the embodiment of the invention, N is greater than 8.

BRIEF DESCRIPTION OF THE DRAWINGS

An embodiment of the invention will now be described, by way of example, with reference to the accompanying drawings in which.

DETAILED DESCRIPTION OF THE EMBODIMENTS OF THE INVENTION

Briefly summarized, it is an objective of the present invention to modify the boost device such that a method of self calibration is enabled by looping the cable from its output back to its input, while control of the parameter selection is performed by a very simple device attached only to the low speed HDMI control bus. The prior art solution (FIGS. 3 to 6) to calibrating a HDMI cable with an embedded boost device has been presented in some detail in order to gain an appreciation of the simplicity of the present invention in which no external high-speed test equipment is required.

Figure 7:
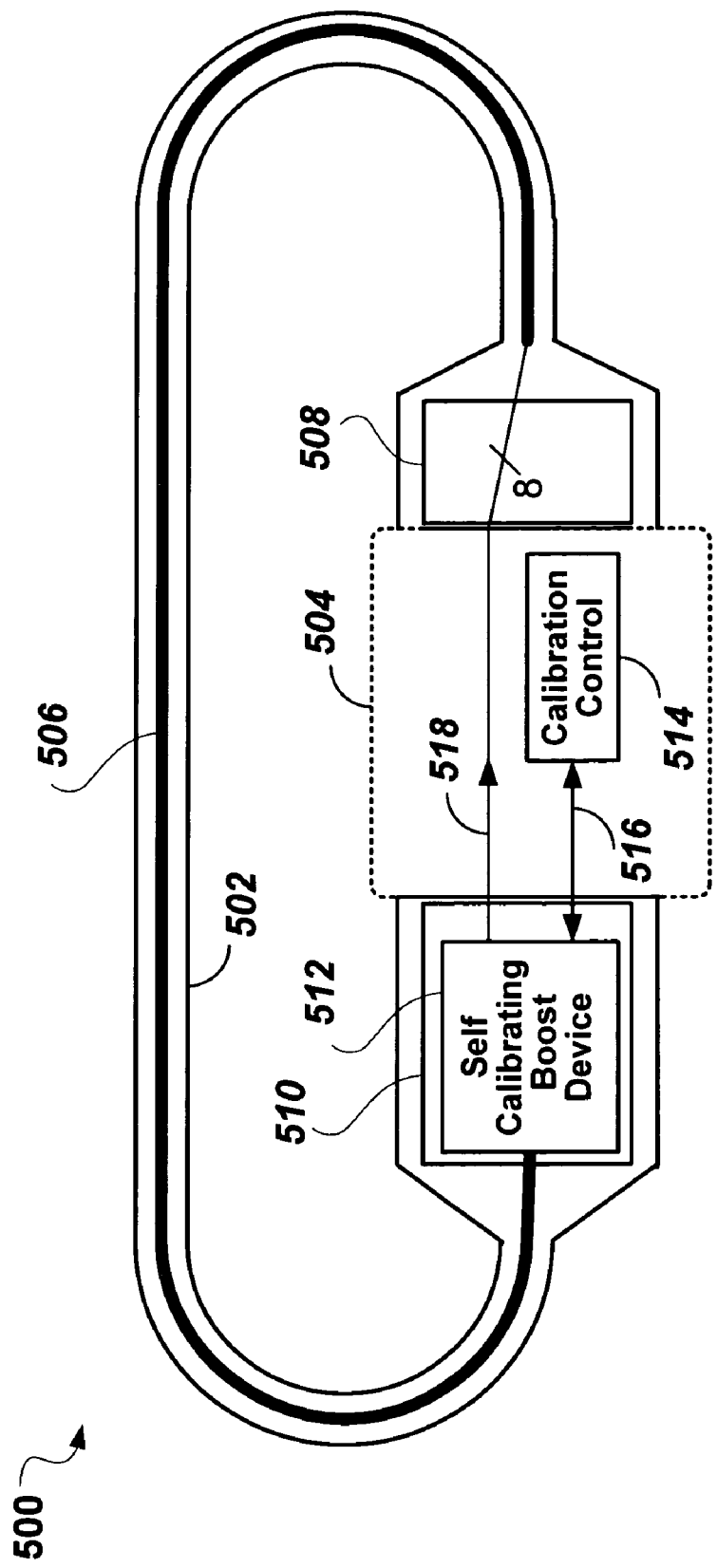
FIG. 7 shows a self-calibration setup 500 including a self calibrating HDMI cable 502 and a Calibration Fixture 504.

FIG. 7 shows a self-calibration setup 500 including a self calibrating HDMI cable 502 and a Calibration Fixture 504. The self calibrating HDMI cable 502 includes a basic (passive) cable 506; an input connector 508; and an output connector 510 which includes a self calibrating (SC) Boost Device 512. The Calibration Fixture 504 includes a calibration control 514 which may be realized in a micro controller or a Field Programmable Gate Array (FPGA). The calibration control 514 is connected to the SC Boost Device 512 over a link 516. The link 516 is conveniently realized through the HDMI control bus (SDA+SDL) that is also known as the $I^2C$ bus. The Calibration Fixture 504 further includes: facilities (not shown explicitly) for the physical connection to the self calibrating HDMI cable 502; a feed-through connection 518 that loops the four high speed HDMI channels (8 wires) from the output connector 510 through the Calibration Fixture 504 to the input connector 508 of the self calibrating HDMI cable 502; and a power supply (not shown) to provide power to the self calibrating HDMI cable 502 and the calibration control 514.

The objective of this arrangement, briefly stated, is that the self calibrating HDMI cable 502 is calibrated automatically when it is inserted in the Calibration Fixture 504 as soon as power is provided.

This is achieved in the following steps:

(a) Of the four high speed channels, one is activated as a test channel, another as a clock or sampling channel. In an HDMI cable and boost device there are four identical high speed channels, one of which is normally, i.e. in the HDMI application, used as a clock channel while the other three channels carry the video signal. In calibrating the cable, all four channels are considered to be the same, and all four channels need to be calibrated. Thus, the calibration of the test channel with the aid of one of the other channels serving as the sampling channel during the calibration is repeated for each of the other channels as well.

(b) The equalizer of the boost circuit of the test channel is programmed with a set of programmable equalizer parameters. To calibrate each channel, the best set of programmable equalizer parameters is found by cycling through all permutations of programmable equalizer parameters, testing the quality of the channel for each permutation, and loading the parameter memory with the current permutation each time a better channel quality is found. In addition to equalizer parameters, the programmable parameters may also include other parameters, for example intra-pair deskew parameters if the boost circuit includes a programmable intra-pair deskew block.

(c) A simple pattern generator in the boost circuit sends a repetitive test pattern on the test channel into the cable, the test pattern repeating in a test pattern cycle of M bits. The test pattern should include an isolated "0" bit, and an isolated "1" bit to generate the worst case inter symbol interference (ISI) on the cable. In this way, the "best" parameter setting will stand out.

(d) The pattern generator in the sampling channel of the boost circuit is programmed to send a clock pattern on the clock channel into the cable, that is a simple alternating "1/0" pattern at the test pattern rate. A single programmable pattern generator may thus conveniently be programmed with either the test pattern or the sampling pattern.

(e) After a round trip through the cable, both the test pattern and the sampling pattern are received back in the boost device at the end of the cable as received data bits and a received sampling clock.

(f) The received sampling clock is delayed through a programmable variable delay, and the waveform of the received test pattern is sampled with an edge of the delayed received sampling clock. Over repeated cycles of the test pattern, the same time slice relative to the beginning of the test pattern can be sampled many times, for example N times. If the waveform of the received test bits is a solid "0" or "1" at the sampling point, each of the N samples will be a logic "0" or "1" respectively. But if the sampling point is near a bit edge of the test pattern, jitter and noise will result in a mix of logic "0"s and "1"s generated by the sampling circuit. When the number of "1"s are counted over a period of N samples, solid "1"s or "0"s will produce counts of N or 0 respectively; but when the sampling is near the bit edge or sampling a noisy signal, an intermediate count between 0 and N may be obtained. The actually observed count C obtained from a single sampling point may be translated into a measure representing signal clarity at that sampling point, indicating closeness to the expected value of N or 0 respectively, even if it is unknown whether a "1" or a "0" is expected at that point.

(g) By varying the delay of the delayed received clock it is thus possible to determine the signal quality over all or part of the test pattern. In effect, varying this delay after each N samples are counted produces a numeric picture of the signal quality. Furthermore, simply accumulating the values of the signal clarity measure C obtained over the period of one bit or more of the test pattern can give an estimate of signal quality Q.

(h) However, in the preferred embodiment of the invention, only the edges of an isolated single bit of the received test pattern are analyzed which permits the duration of the bit, i.e. a received pulse width is determined which, when compared with the transmitted pulse width of the same bit in the transmitted test pattern, gives an indication of the quality of the equalization. When the two pulses have the same width, the channel is deemed to be "good", that is calibrated.

(i) For each permutation of the set of parameters of the boost circuit, the steps (f) and (g) are repeated, and the parameter settings that yield the best match of pulse widths are retained in the parameter memory of the boost circuit, thus completing the calibration of one channel.

(j) the steps (b) to (i) are repeated for each channel until all four high speed channels of the boost device have been calibrated.

Because the test pattern may be repeated many times and the programmable delay may be set to sample the same part of the test pattern, effective oversampling is done over time in the cable calibration procedure of the present invention, without having to generate many oversampling clock phases in the same bit time frame. The new method of using the proposed scheme to merely measure or estimate a pulse width is much simpler and requires much less high-speed circuitry than the performance analysis circuit 308 of FIG. 5 for example. While the oversampling and reclocking circuit 316 of the performance analysis circuit 308 of FIG. 5 generates of a 24-sample digital samples signal 332 representing each received data bit in real time, the effective oversampling proposed in the present invention is stretched out in time, using the stroboscope principle to obtain just one sample during each repetition of the entire test pattern. And instead of evaluating the 24-sample digital samples signal 332 in parallel in the Training Function 318, evaluation of the samples may be done more slowly in a micro controller or a FPGA from sample counts recorded in a small memory. This takes advantage of closely spaced delay steps and natural jitter and noise near the bit edges of both the test pattern and the sampling clock to generate statistically based counts from which the actual bit edge positions are readily interpolated.

Figure 8:
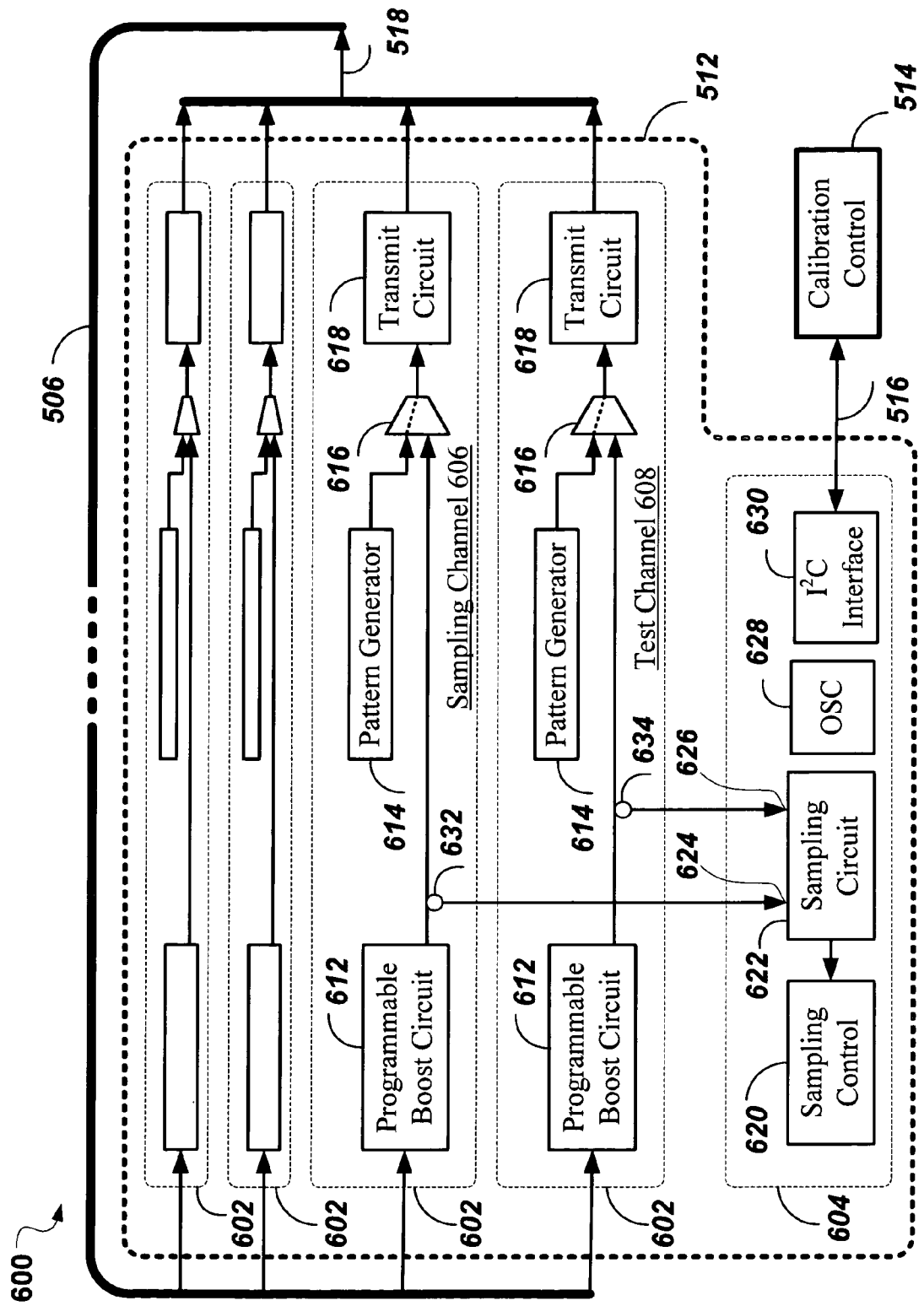
FIG. 8 shows a block diagram 600 of the self calibrating (SC) Boost Device 512 together with the basic cable 506, the Calibration Control 514, and the feed-through connection 518, of the self-calibration setup 500 of FIG. 7.

FIG. 8 shows a block diagram 600 of the self calibrating (SC) Boost Device 512 together with the basic cable 506, the Calibration Control 514, and the feed-through connection 518, of the self-calibration setup 500 of FIG. 7. The SC Boost Device 512 includes four identical Channel Circuits 602 and a Calibration Circuit 604. As shown in FIG. 8, one of the Channel Circuits 602 is selected and activated as a Sampling Channel 606. A second one of the Channel Circuits 602 is selected and activated as a Test Channel 608. Any of the Channel Circuits 602 may serve as the Sampling Channel 606, and each of the Channel Circuits 602 can be selected as the Test Channel 608. One of several possible configurations are shown in FIG. 8 as an example for the purpose of the description. All Channel Circuits 602 are capable of being selected as Sampling and Test Channels 606 and 608 respectively under control of the Calibration Control 514. The block diagram 600 shows each channel circuit 602 to include a Programmable Boost Circuit 612 with one input and one output, a Pattern Generator 614 with one output, a Multiplexer 616 with first and second inputs and an output, and a Transmit Circuit 618 with one input and one output. The Calibration Circuit 604 includes: an Sampling Control 620 with one input; a Sampling Circuit 622 with one output, a sampling input 624, and a test data input 626; a Test Oscillator (OSC) 628; and an I²C interface 630 with a bidirectional input/output. In the interest of clarity, not all inputs and outputs of all circuit blocks are shown in the block diagram 600.

The output of the Transmit Circuit 618 of each channel circuit 602 is connected through the feed-through connection 518 to one end of the basic cable 506. The other end of the basic cable 506 is connected to the input of the Programmable Boost Circuit 612 of each channel circuit 602, the cable providing a loop-back path from the output of each Transmit Circuit 618 to the input of the corresponding Programmable Boost Circuit 612 in the same channel circuit 602.

Within each channel circuit 602, the output of the Programmable Boost Circuit 612 is connected to the first input of the Multiplexer 616; the output of the Pattern Generator 614 is connected to the second input of the Multiplexer 616; and the output of the Multiplexer 616 is connected to the input of the Transmit Circuit 618.

A sampling tap 632 on the output of the Programmable Boost Circuit 612 of the Channel Circuits 602 that is currently activated as the Sampling Channel 606, is connected to the sampling input 624 of the Sampling Circuit 622. Similarly, a data tap 634 on the output of the Programmable Boost Circuit 612 of the Channel Circuits 602 that is currently activated as the Test Channel 608, is connected to the test data input 626 of the Sampling Circuit 622. The output of the Sampling Circuit 622 is connected to the input of the Sampling Control 620. The sampling tap 632 and the data tap 634 are attached in the Sampling Channel 606 and the Test Channel 608 respectively as shown to indicate one configuration that may be used in the calibration of the Test Channel 608. When calibrating the SC Boost Device 512, each of the Channel Circuits 602 must in turn be activated as the Test Channel 608 and calibrated, while any of the other Channel Circuits 602 may be chosen as the Sampling Channel 606. Note that the Channel Circuit 602 that is used as the Sampling Channel 606, does not already need to have been calibrated because even before the cable is calibrated, it will carry the sampling clock adequately for the purpose of calibrating the Test Channel 608.

The Multiplexer 616 is used to select the signal to be transmitted by the Transmit Circuit 618 of each Channel Circuit 602. In calibration mode as shown here in FIG. 8, the output of the Pattern Generator 614 is selected and switched through the Multiplexer 616 to the input of the Transmit Circuit 618, as indicated by a dotted line in the diagram. In this way a boosted signal path extends from the Pattern Generator 614; through the Multiplexer 616; through the Transmit Circuit 618; through the feed-through connection 518; through the basic cable 506; through the Programmable Boost Circuit 612; and on to the Sampling Circuit 622 for those two Channel Circuits 602 for which a sampling tap or data tap (632 or 634) currently exists. The other Channel Circuits 602 are of no interest until they are activated as the Test Channel 608 for calibration, or as the Sampling Channel 606.

Figure 1:
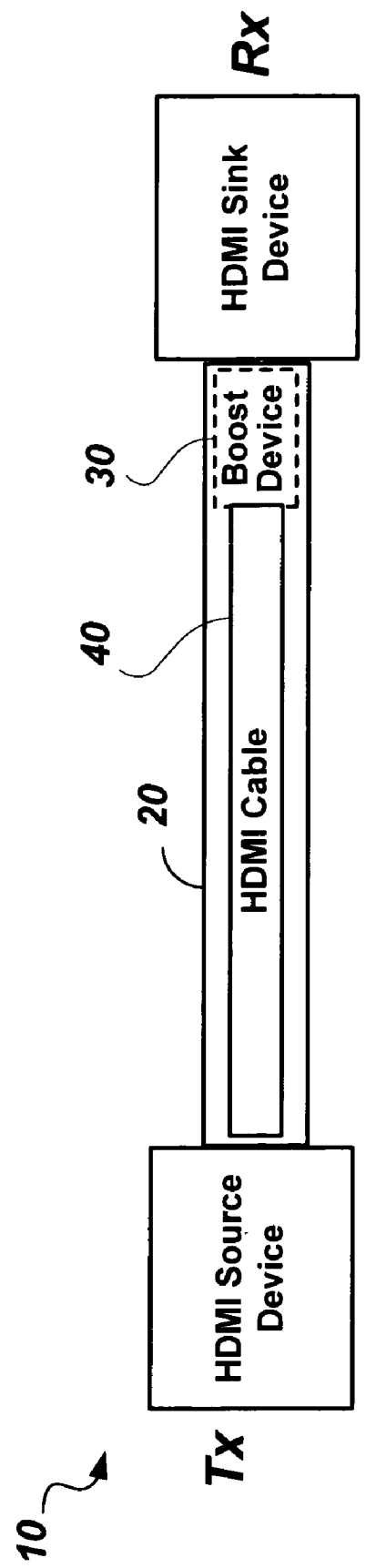
FIG. 1 shows an the HDMI system 10 including an improved HDMI cable 20 of the prior art.
Figure 2:
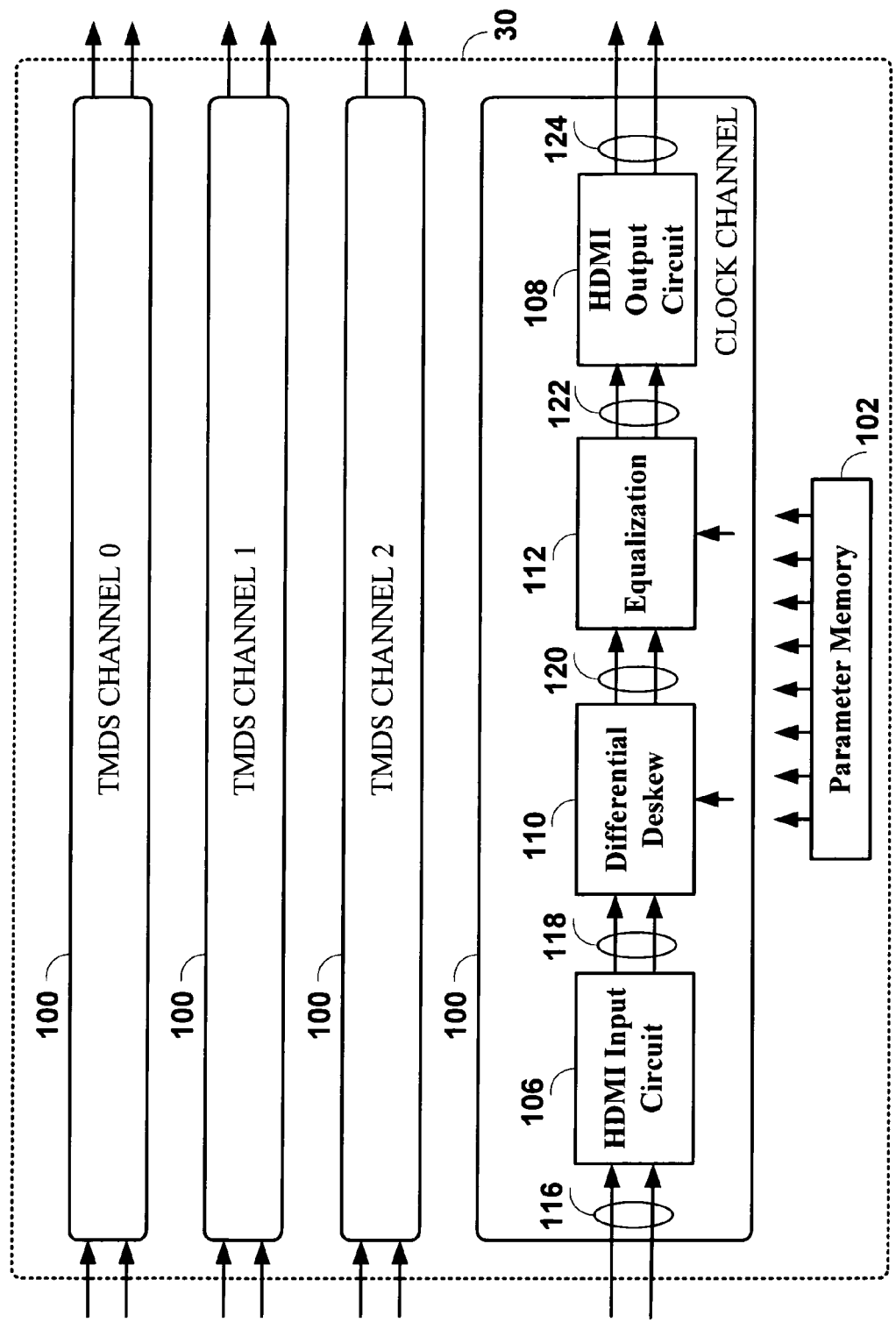
FIG. 2 shows a block diagram of circuits that are included in the boost device 30 of the HDMI system 10 of FIG. 1 of the prior art.
Figure 3:
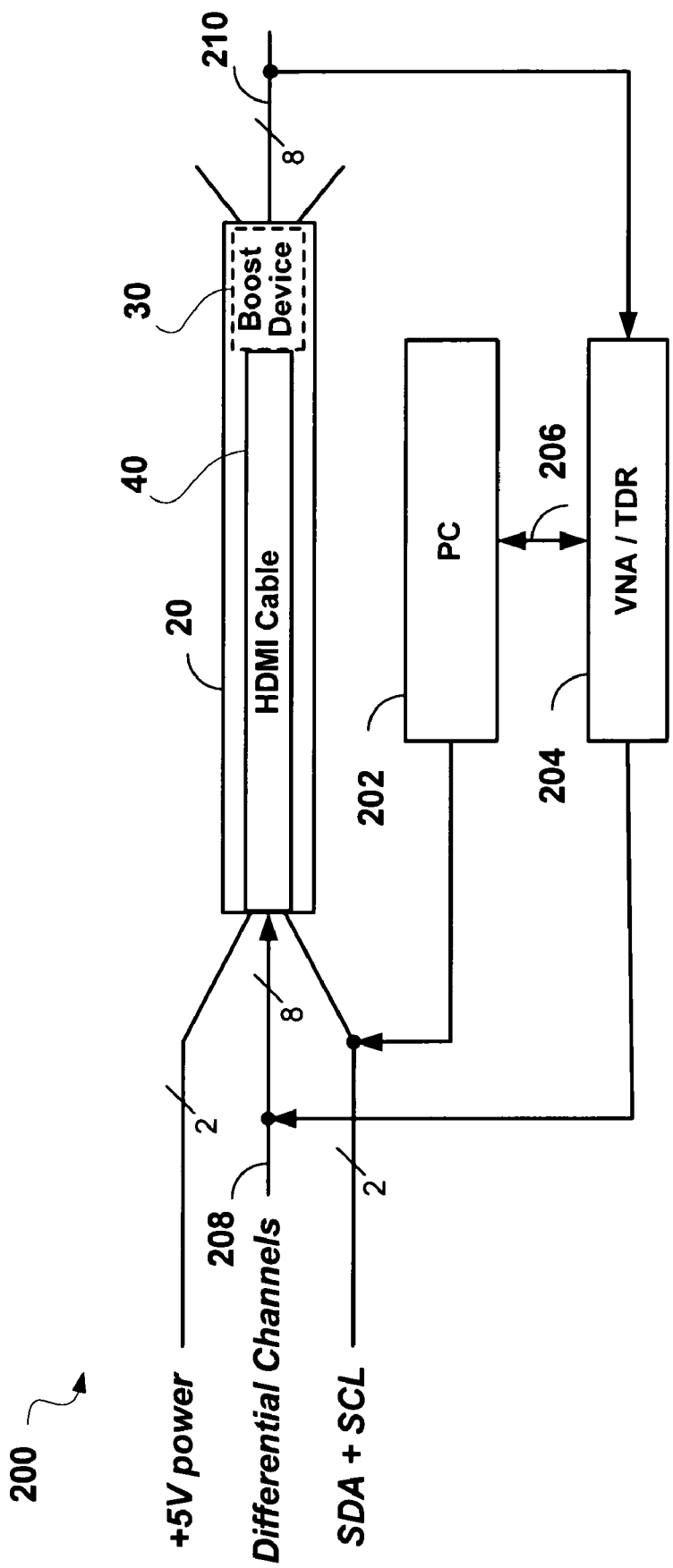
FIG. 3 shows a generic test set up 200 for Frequency Domain and Time Domain Calibration methods of the prior art.
Figure 4:
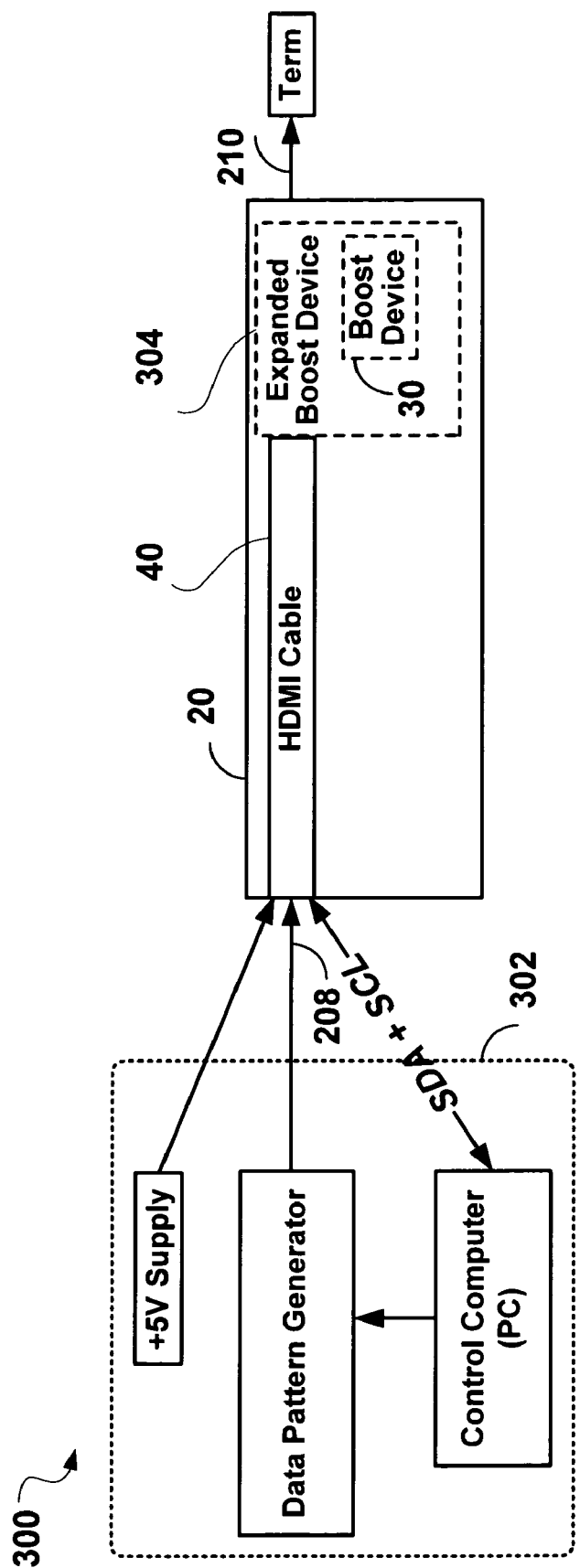
FIG. 4 shows a Real Time Configuration 300 used in a Real Time Cable Calibration method of the prior art.
Figure 5:
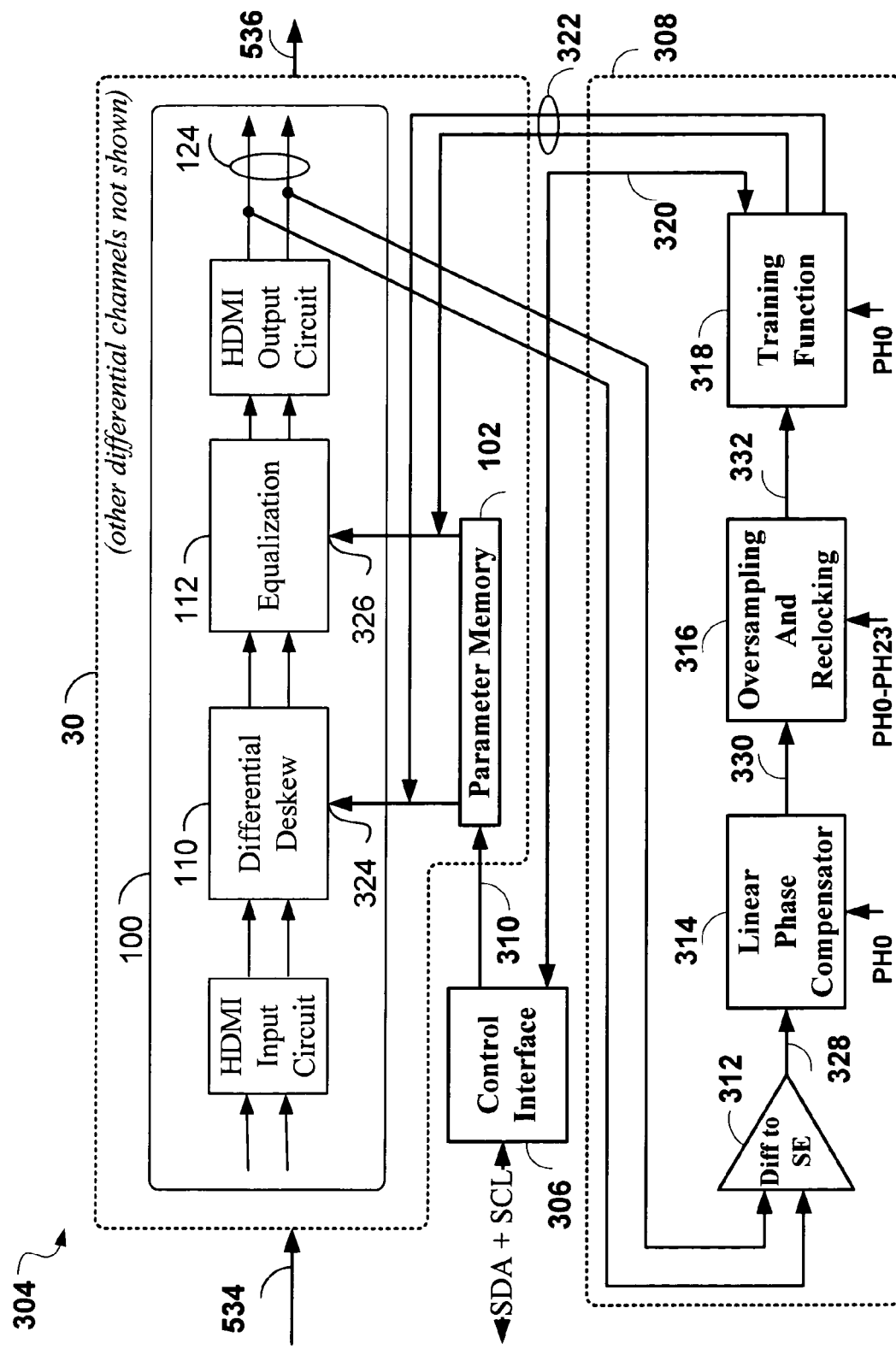
FIG. 5 shows a simplified block diagram of the expanded boost device 304 of FIG. 4 of the prior art.
Figure 6:
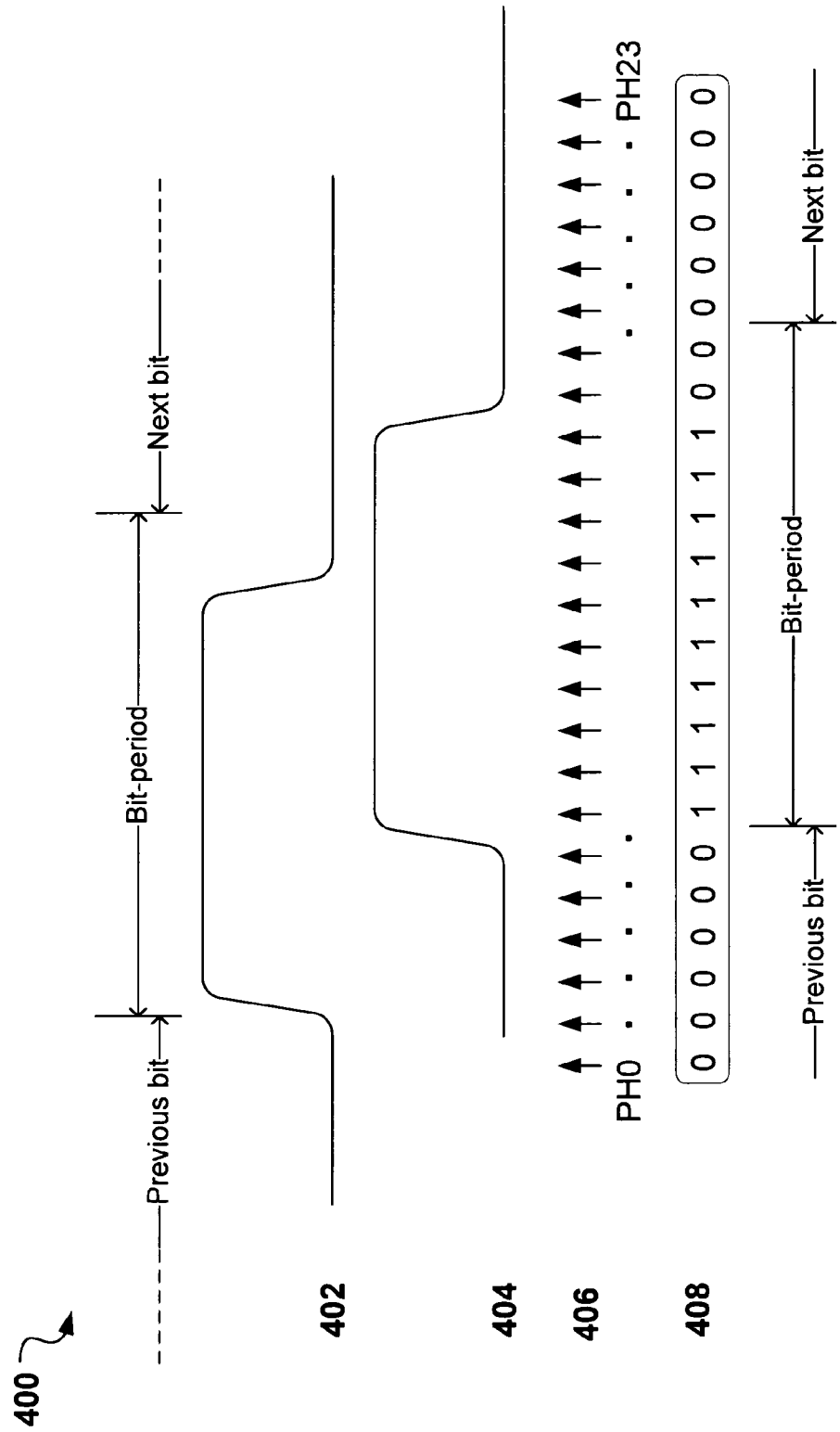
FIG. 6 illustrates with a diagram 400 an example of oversampling in the Oversampling and Reclocking block 316 of FIG. 5.

When in mission mode (not shown in FIG. 8), that is when the self calibrating HDMI cable 502 is used to connect an HDMI source to an HDMI sink, in a configuration similar to the one shown in FIG. 1, the output of the Programmable Boost Circuit 612 is selected in the Multiplexer 616 and switched to the input of the corresponding Transmit Circuit 618 in every Channel Circuit 602, thus providing a boosted signal path that extends from the input of every Programmable Boost Circuit 612 to the output of the corresponding Transmit Circuit 618. The mission mode may be selected permanently once the cable has been calibrated.

Figure 9:
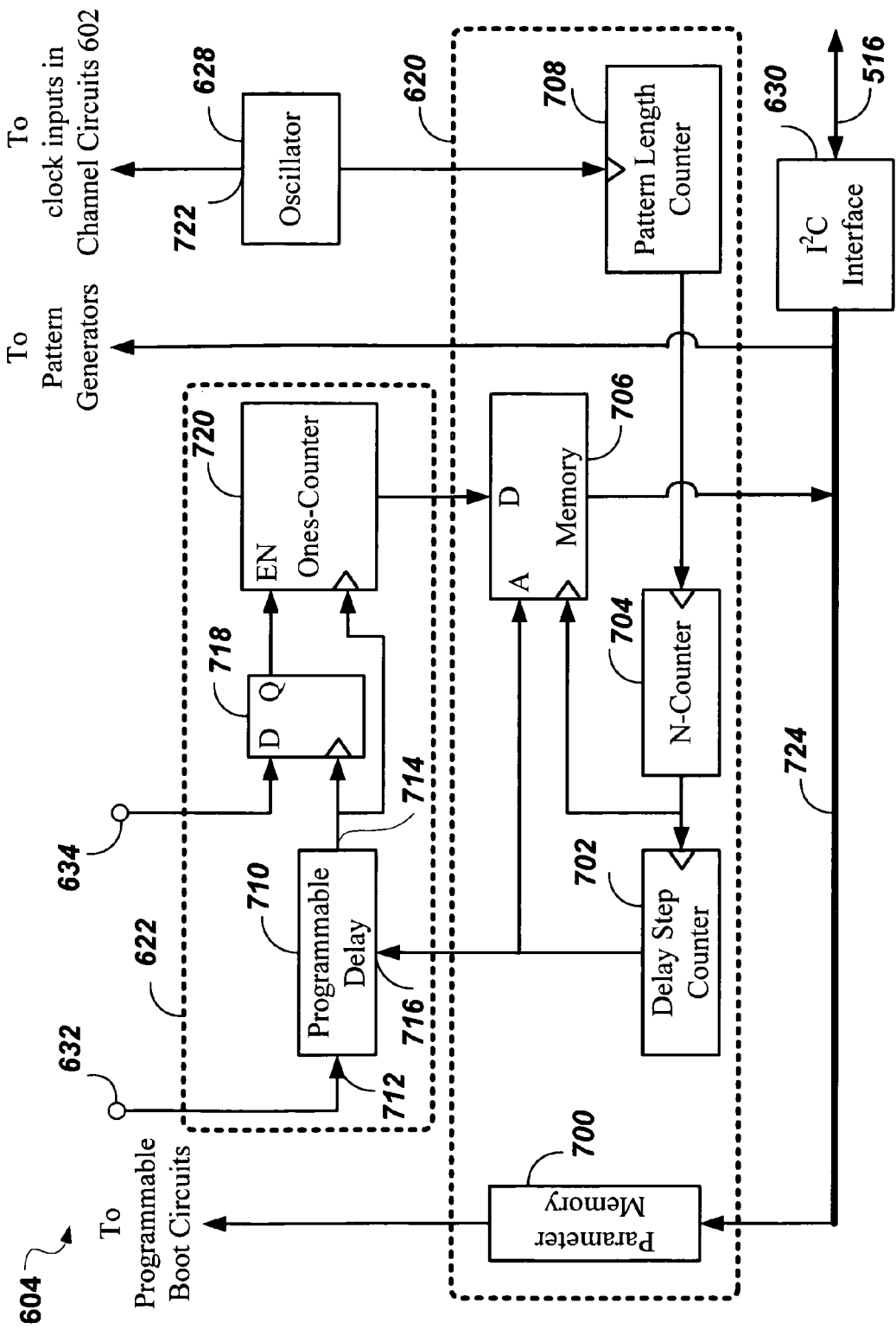
FIG. 9 shows a block diagram of components of the Calibration Circuit 604 of FIG. 8 in more detail.

FIG. 9 shows a block diagram of components of the Calibration Circuit 604 of FIG. 8 in more detail, the same reference numerals as in FIG. 8 indicating like items. The Sampling Control 620 includes a Parameter Memory 700; a Delay Step Counter 702; an N-Counter 704; a small Memory 706 having an address (A) and a data (D) input; and a Pattern Length Counter 708. The Sampling Circuit 622 includes a Programmable Delay 710 which is a binary-controlled delay circuit and has a signal input 712, a delayed sampling pulse output 714, and a delay programming input 716; a sampling circuit element implemented as a sampling Flip Flop (FF) 718; and a means for determining an average of the values of N generated samples implemented as a Ones-Counter 720.

The Oscillator 628 has an output 722 which is connected (not shown) to clock inputs of the Pattern Generators 614 and of the Transmit Circuits 618 in the Channel Circuits 602. The Oscillator 628 is also connected to chain of counters that begins with the Pattern Length Counter 708. The Oscillator 628 drives a clock input of the Pattern Length Counter 708. An output (which may be the carry-output or the most significant bit) of the Pattern Length Counter 708 drives a clock input of the Divide-By-N Counter (N-Counter) 704. An output (which may be the carry-output or the most significant bit) of the Divide-By-N Counter 704 drives a clock input of the Delay Step Counter 702 (means for varying the programmable delay) as well as a clocked write input of the Memory 706. An output from the Delay Step Counter 702 drives a delay programming input 716 of the Programmable Delay 710, as well as the address input (A) of the Memory 706.

The signal input 712 of the Programmable Delay 710 receives a sampling clock signal from the sampling tap 632 in the activated Sampling Channel 606; from this the Programmable Delay 710 generates a delayed sampling pulse 714 which drives the clock input of the sampling FF 718 as well as the clock input of the Ones-Counter 720. The D-input of the sampling FF 718 receives a data signal from the data tap 634 in the activated Test Channel 608. Not shown in FIG. 9 are sampling tap and data tap activators (selectors) which may be used to attach the corresponding taps to the appropriate Channel Circuits 602 under control of the Calibration Control 514 (means for interpolating between delay steps). The Q-output of the sampling FF 718 drives an enable (EN) input of the Ones-Counter 720, and the binary contents (the ones count) of the Ones Counter 720 is transmitted as data to the Memory 706 when it is clocked by the output of the N-Counter 704. The Memory 706 is addressed by the output of the Delay Step Counter 702, thus storing a ones count for each delay step, for subsequent analysis by the Calibration Control 514.

The I²C interface 630 provides a link between the bidirectional I²C-bus 516 that connects to the Calibration Control 514 (FIG. 8) and an internal control bus 724. The internal control bus 724 provides control access into the self calibrating Boost Device 512 for programming the Pattern Generators 614 in the Channel Circuits 602, and through the Parameter Memory 700 the Programmable Boot Circuits 612. Not shown in FIG. 9 are the reset signals of the counters (702, 704, 706, 720) and the Memory 706 which are also reached through the internal control bus 724. The output of the Memory 706 is coupled to the internal control bus 724.

To facilitate the description of the functions of the self calibrating Boost Device 512 and its Calibration Circuit 604, a set of timing diagrams and a set of flow charts are introduced.

Figure 10:
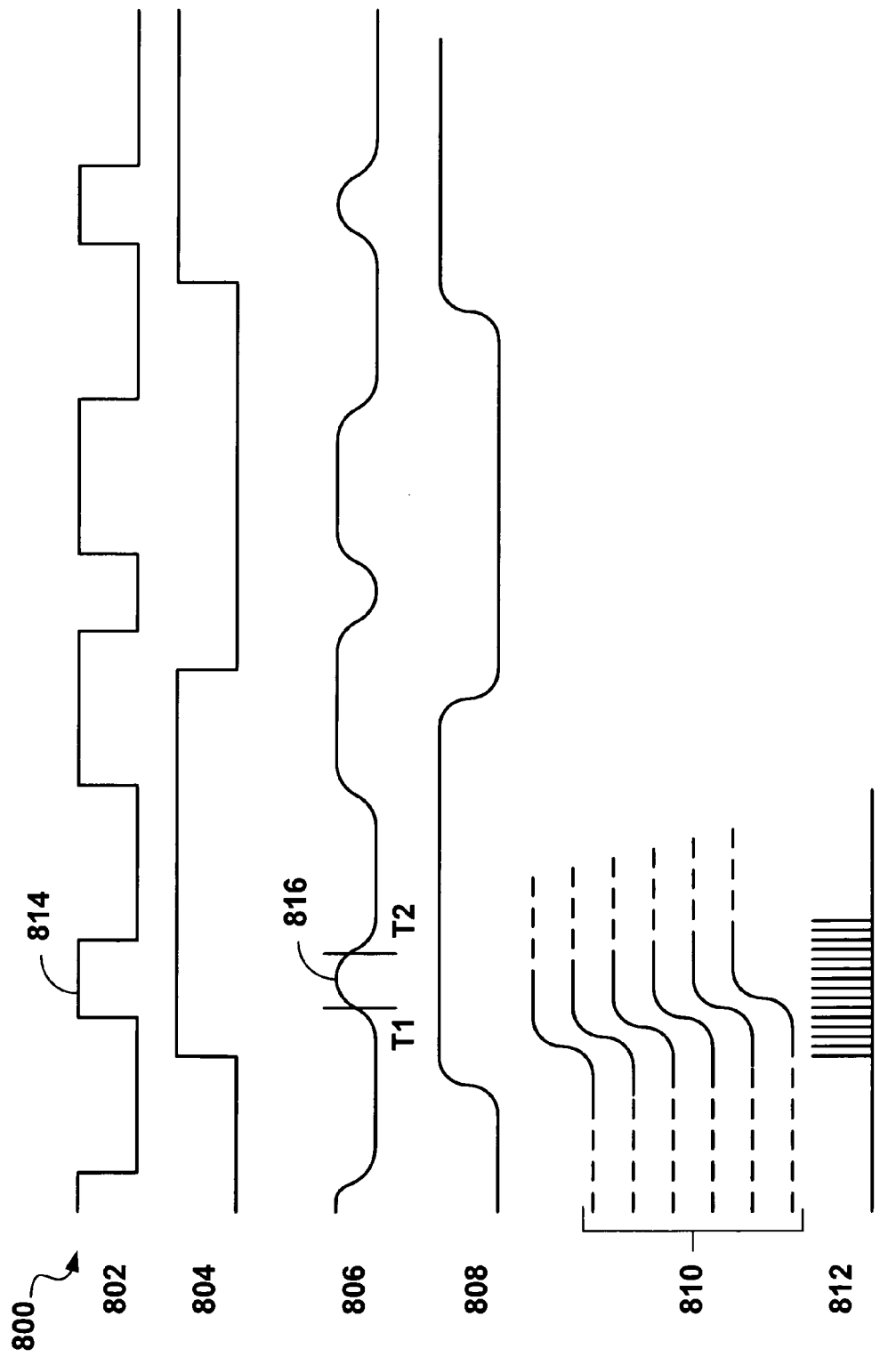
FIG. 10 shows a timing diagram 800 illustrating wave form examples pertaining to the self calibrating Boost Device 512.

FIG. 10 shows a timing diagram 800 illustrating wave form examples pertaining to the self calibrating Boost Device 512, comprising wave forms of: a transmitted test pattern 802 including a transmitted single "1" bit 814; a transmitted sampling pattern 804; a received test pattern 806 including a received single "1" bit 816 and rising and falling edges of this bit T1 and T2 respectively; a received sampling pattern 808; a partial series of delayed sampling clocks 810; and a compact representation 812 of the series of delayed sampling clocks 810.

The transmitted test pattern 802 is representative of the signal generated by the Test Pattern Generator 614 and transmitted in the Test Channel 608. The transmitted test pattern 802 is designed to make the pattern balanced, and to separate the single "1" bit 814 by at least two consecutive "0" bits, so that any inter symbol interference (ISI) introduced in the cable strongly affects the single "1" bit 814. In the calibration of the Test Channel 608, the Programmable Boost Circuit 612 is then adjusted until the shape of the received single "1" bit 816 is as close as possible to the shape of the transmitted single "1" bit 814, thus optimally compensating for the ISI or other impairments introduced by the basic cable 506).

The transmitted sampling pattern 804 is another representative of the signal generated by the Test Pattern Generator 614 which is transmitted in the Sampling Channel 606. The transmitted sampling pattern 804 is designed to resemble a simple square wave with a rising edge coincident with or near the edges of the single "1" bit of the transmitted test pattern 802.

The transmitted test pattern 802 and the transmitted sampling pattern 804 are merely examples of patterns that may programmed by the Calibration Control 514 into the Test Pattern Generator 614.

The wave form of the received test pattern 806 is illustrative of the signal received at the data tap 634 in the Test Channel 608, and the received sampling pattern 808 is illustrative of the signal received at the sampling tap 632 in the Sampling Channel 606. The latter signal (808) appears at the signal input 712 of the Programmable Delay 710 (FIG. 9). Not shown in FIG. 10 is the precise timing relationship of the transmitted and the received signals. Although the transmitted test and sampling patterns 802 and 804 are emitted in close synchronism, being generated by a common clock (the Oscillator 628, FIG. 8), the received test and sampling patterns 806 and 808 are delayed and may also skewed with respect to each other, as a result of having traveled through the cable.

Each of the series of delayed sampling clocks 810 illustrates a different representative phase of for N consecutive repetitions of the sampling clock pattern 808 the delayed sampling pulse 714 (FIG. 9) of the Programmable Delay 710. Although shown here together in the same diagram, the delayed sampling clocks 810 do not appear in the same time frame; rather each is repeated N times before being replaced by another phase.

The compact representation 812 of the series of delayed sampling clocks 810 shows only the active (positive) edges of the delayed sampling clocks 810. This illustrates the virtual oversampling of the same (repetitive) test pattern that occurs over a period time.

Figure 11:
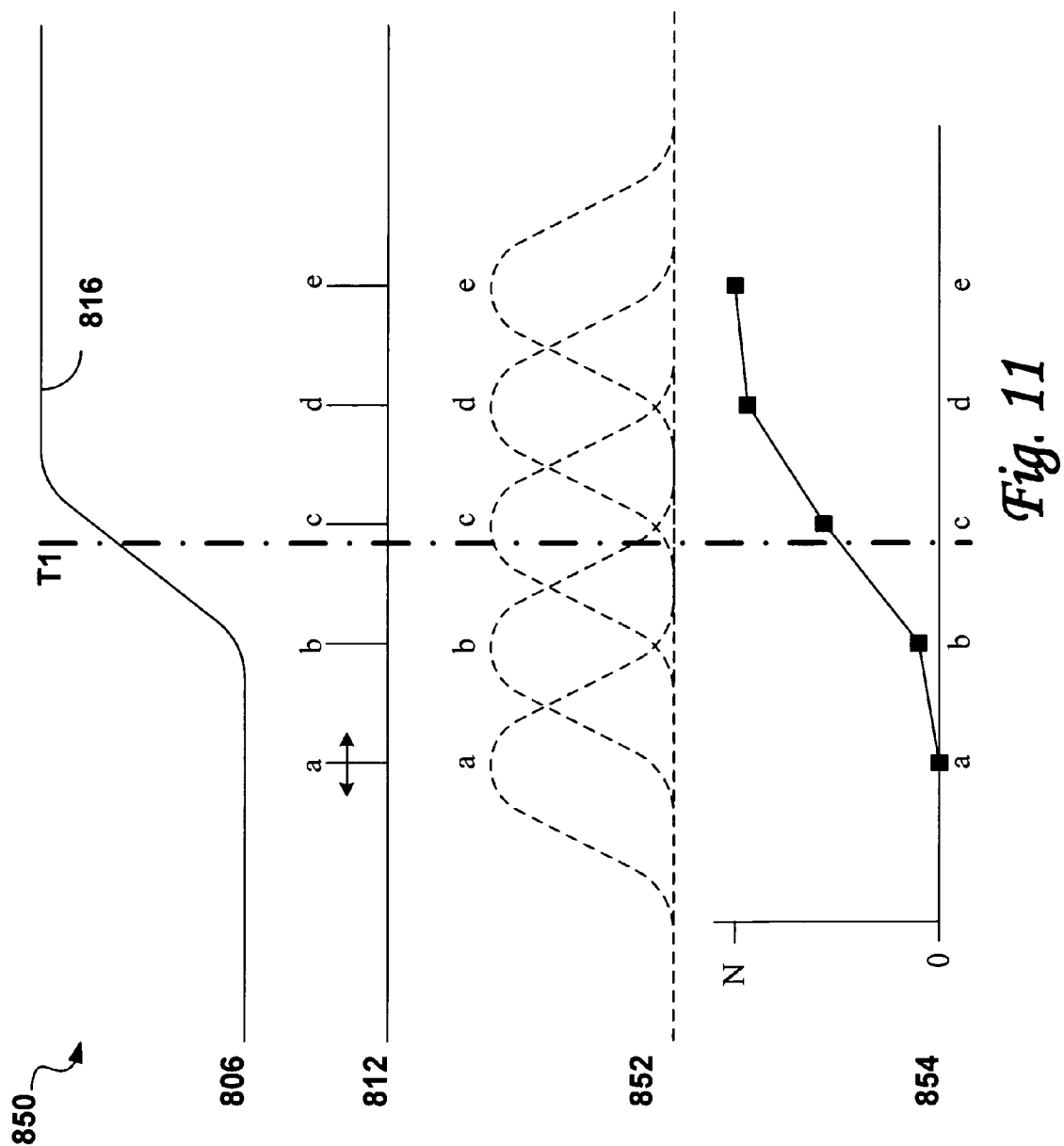
FIG. 11 shows an edge sampling diagram 850 illustrating magnified parts of wave forms from FIG. 10.

FIG. 11 shows an edge sampling diagram 850 illustrating magnified parts of wave forms from FIG. 10, that is the received test pattern 806 including the received single "1" bit 816 with the leading edge T1, and the compact representation 812 of the series of delayed sampling clocks 810 including sampling pulses "a" to "e". The edge sampling diagram 850 further includes a series of bell curves 852 also marked "a" to "e". Each bell curve 852.a to 852.e illustrates that each of the corresponding delayed sampling clocks 810.a to 810.e is typically spread out over time due to jitter and noise. The bell curves also include a similar effect caused by the slight inaccuracy in sampling the received single "1" bit 816 in the sampling Flip Flop (FF) 718 (FIG. 9). The width of each bell curve 852 appears large in this diagram because of the high frequencies involved. The duration of the received single "1" bit 816 may typically be of the order of 500 pico seconds (pS), and the spacing of the delayed sampling clocks 810, i.e. the resolution of the Programmable Delay 710 may be on the order of 10 to 50 pS. The edge sampling diagram 850 further includes a sampling counts chart 854. The horizontal axis is marked "a" to "e", and the vertical axis represents a scale from 0 to N. Solid squares in the sampling counts chart 854 indicate the content of the Ones-Counter 720 (FIG. 9) after the received single "1" bit 816 was sampled N times with each of the sampling pulses "a" to "e" respectively. The "1"s sampling count for "a" is 0 (zero) resulting from the sampling the waveform of the received test pattern 806 (before received single "1" bit 816) when it is still logic "0"; similarly, the "1"s sampling count for "e" is N resulting from the sampling the waveform of the received single "1" bit 816 when it is a logic "1"; but the sampling counts "b", "c", and "d" each have intermediate values between 0 and N resulting from the sampling the waveform of the received single "1" bit 816 along the slope of the rising edge of the received single "1" bit 816. For example, the bell curve for "c" shows that statistically somewhat less than half of the samples will report "0" (below an assumed "0"/"1" threshold of the sampling Flip Flop (FF) 718) and thus not be counted, and somewhat more than half of the samples will report "1". Correspondingly the "1"s count for "c" is intermediate. Each "1"s count represents an averaging measurement of the signal level at the delay step of to the Programmable Delay 710. By interpolating the "1"s counts along the slope, it is possible to estimate the actual edge of the slope T1 after sampling the wave form of the received single "1" bit 816 in the vicinity of the slope.

The pulse width of the received single "1" bit 816 may thus be estimated by determining the relative position in time of the "0"-"1" transition (T1 shown in FIG. 11), similarly determining the relative position in time of the "1"-"0" transition (T2), and subtracting the two. With distortion, this pulse width may not be equal to the (known) pulse width of the transmitted single "1" bit 814. The task of the calibration is simply to vary parameters of the Programmable Boost Circuit 612 until they are as close as possible or equal.

Figure 12:
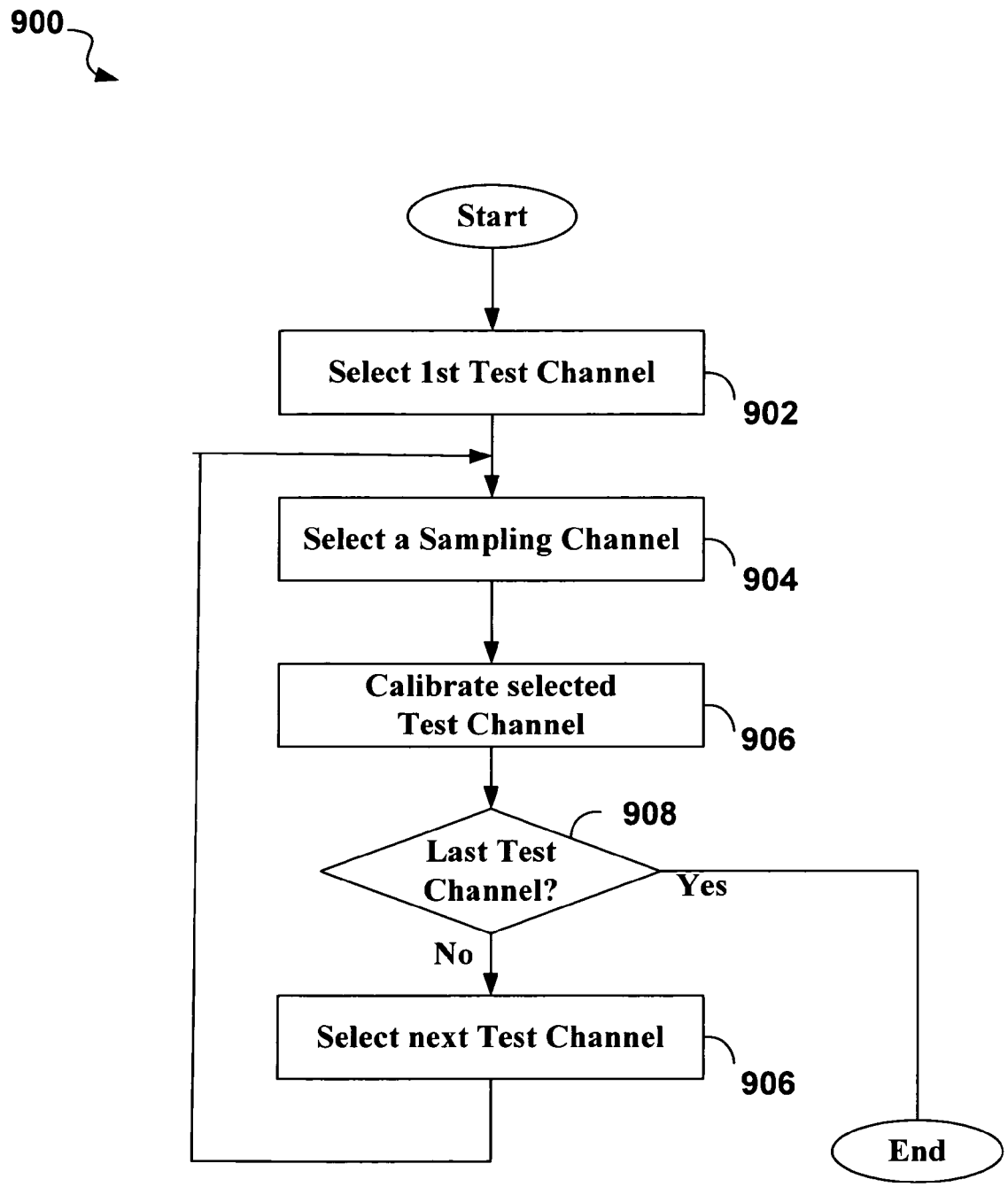
FIG. 12 shows an overall flow chart 900 of the calibration progress of the self-calibration setup 500 of FIG. 7.

FIG. 12 shows an overall flow chart 900 of the calibration progress of the self-calibration setup 500 of FIG. 7, including steps:
902: "Select 1st Test Channel";
904: "Select a Sampling Channel";
906: "Calibrate the selected Test Channel";
908: Determine if this the "last Test Channel?"; and
910: "Select next Test Channel".

The top-level flow chart 900 reflects the fact that there are four high speed channels to be calibrated in the self calibrating HDMI cable 502. After arbitrarily selecting a first Channel Circuit 602 as the Test Channel 608 in the step 902 "Select 1st Test Channel", a different Channel Circuit 602 is selected as the Sampling Channel 606 in the step 904 "Select a Sampling Channel". In the next step 906 "Calibrate the selected Test Channel" the Test Channel 608 is calibrated. As long as this is not the last Test Channel ("NO" from the next step 908 "last Test Channel?"), the next Test Channel is selected in the step 910 "Select next Test Channel". The steps 904 to 910 are repeated until all Channel Circuits 602 have been calibrated ("YES" from the step 908 "last Test Channel?").

Figure 13:
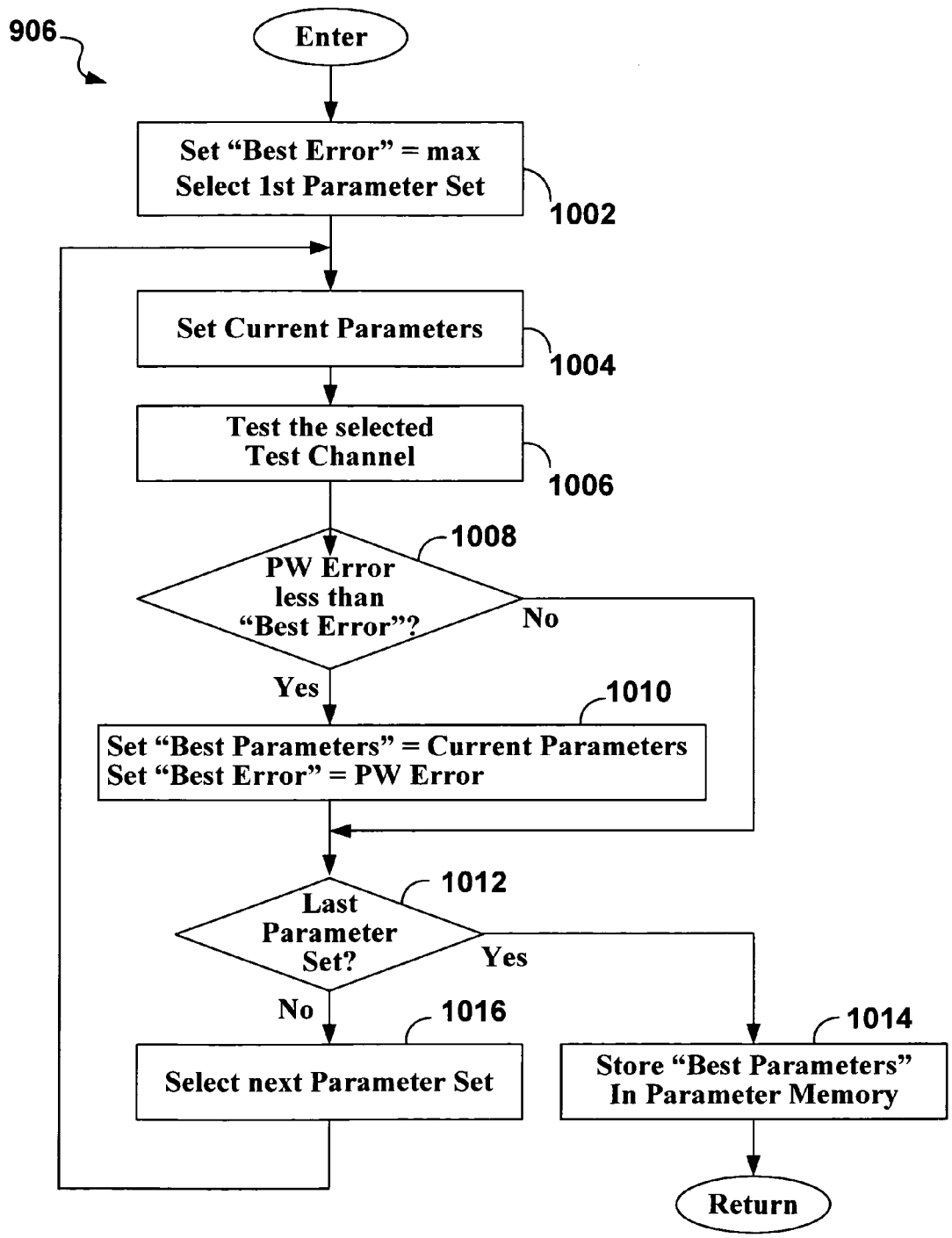
FIG. 13 shows an expansion of the step 906: "Calibrate the selected Test Channel" of FIG. 12.

FIG. 13 shows an expansion of the step 906: "Calibrate the selected Test Channel" of FIG. 12, including steps:
1002: "Set Best Error=max, and select first Parameter Set";
1004: "Set Current Parameters";
1006: "Test the selected Test Channel";
1008: Determine if "PW Error less than Best Error";
1010: "Set Best Parameters=Current Parameters, and Set Best Error=PW Error";
1012: Determine if this is the "Last Parameter Set?";
1014: "Store Best Parameters in Parameter Memory"; and
1016: "Select next Parameter Set".

The calibration of one channel (the selected Test Channel) is focussed on reducing a Pulse Width (PW) Error to a minimum by setting parameters of the Programmable Boost Circuit 612. The PW Error is defined as the absolute difference between the known pulse width of a transmitted bit (the transmitted single "1" bit 814), and the pulse width of the received single "1" bit 816.

In initializing the calibration of one channel (the selected Test Channel) in the step 1002 "Set Best Error=max, and select first Parameter Set", a "Best Error" is defined and set at to high value, and a first set of parameters, of the Programmable Boost Circuit 612 is selected as the current parameters.

In the step 1006 "Test the selected Test Channel" the selected Test Channel is tested, that is the pulse width error of the received single "1" bit 816 is determined. The pulse width error is indicative of the performance of the Programmable Boost Circuit 612 in terms of equalization or compensation of other cable impairments. If it is found that the PW Error is less than the previously established Best Error, ("YES from the step 1008 "PW Error less than Best Error"), the current parameters are recorded as the "Best Parameters" and the PW Error is recorded as the Best Error in the step 1010 "Set Best Parameters=Current Parameters, and Set Best Error=PW Error", other wise the step 1010 is skipped. If it is determined that all parameter sets have been used (YES from the step 1012 "Last Parameter Set?") the best parameter set is permanently stored in the parameter memory in the step 1014 "Store Best Parameters in Parameter Memory" completing the calibration of this channel, otherwise ("NO" from the step 1012) the next parameter set is selected in the step 1016 "Select next Parameter Set", and the channel is tested with the new current parameters beginning with the step 1004 above. The step 1014 "Store Best Parameters in Parameter Memory" is preferably carried out by the Calibration Control 514 (FIGS. 7 and 8) of the Calibration Fixture 504 which accesses the Parameter Memory 700 through the link 516 and the I²C interface 630 (FIGS. 8 and 9).

Figure 14:
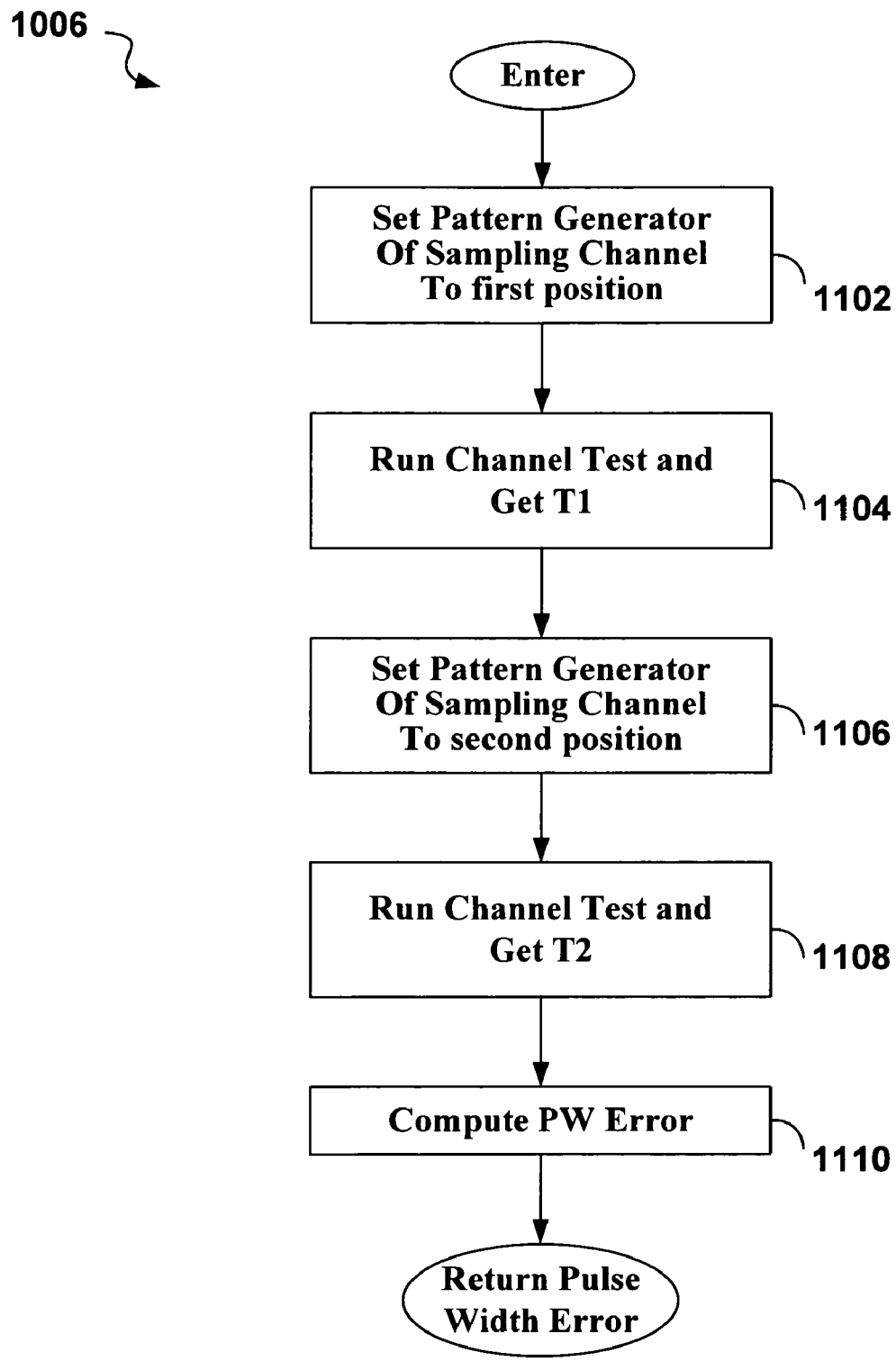
FIG. 14 shows an expansion of the step 1006: "Test the selected Test Channel" of FIG. 13.

FIG. 14 shows an expansion of the step 1006: "Test the selected Test Channel" of FIG. 13, including steps:
1102: "Set Pattern Generator of Sampling Channel to first position";
1104: "Run Channel Test and Get T1";
1106: "Set Pattern Generator of Sampling Channel to second position";
1108: "Run Channel Test and Get T2"; and
1110: "Compute PW Error".

Testing the selected Test Channel 608, is equivalent to obtaining the pulse width (PW) error with the currently set parameters. In the first step 1102 "Set Pattern Generator of Sampling Channel to first position" the pattern generator 614 of the sampling channel 606 (FIG. 8) is programmed such that the sampling (positive going) edge of the transmitted sampling pattern 804 occurs before the rising edge of the transmitted single "1" bit 814. This is the position shown in FIG. 10, and allows the delayed sampling clocks 810 to cover the rising edge of the received single "1" bit 816 (at T1).

In the next step 1104 "Run Channel Test and Get T1" the channel is tested (FIG. 15 below) to obtain an estimate of the relative time T1 of the rising edge of the received single "1" bit 816.

In the step 1106 "Set Pattern Generator of Sampling Channel to second position" the pattern generator 614 of the sampling channel 606 (FIG. 8) is programmed such that the sampling (positive going) edge of the transmitted sampling pattern 804 occurs before the falling edge of the transmitted single "1" bit 814. This position allows the delayed sampling clocks 810 to cover the falling edge of the received single "1" bit 816 (at T1). The step 1106 may not be required if the range of the Programmable Delay 710 is sufficient to cover both edges T1 and T2.

In the next step 1104 "Run Channel Test and Get T2" a the channel is tested again, this time to obtain an estimate of the relative time T2 of the falling edge of the received single "1" bit 816. The pulse width error may then be simply computed by subtracting the difference between T1 and T2 from the known transmitted pulse width (TPW) of the transmitted single "1" bit 814 in the step 1110 "Compute PW Error": PW Error=absolute value of (TPW−((T2−T1)).

Figure 15:
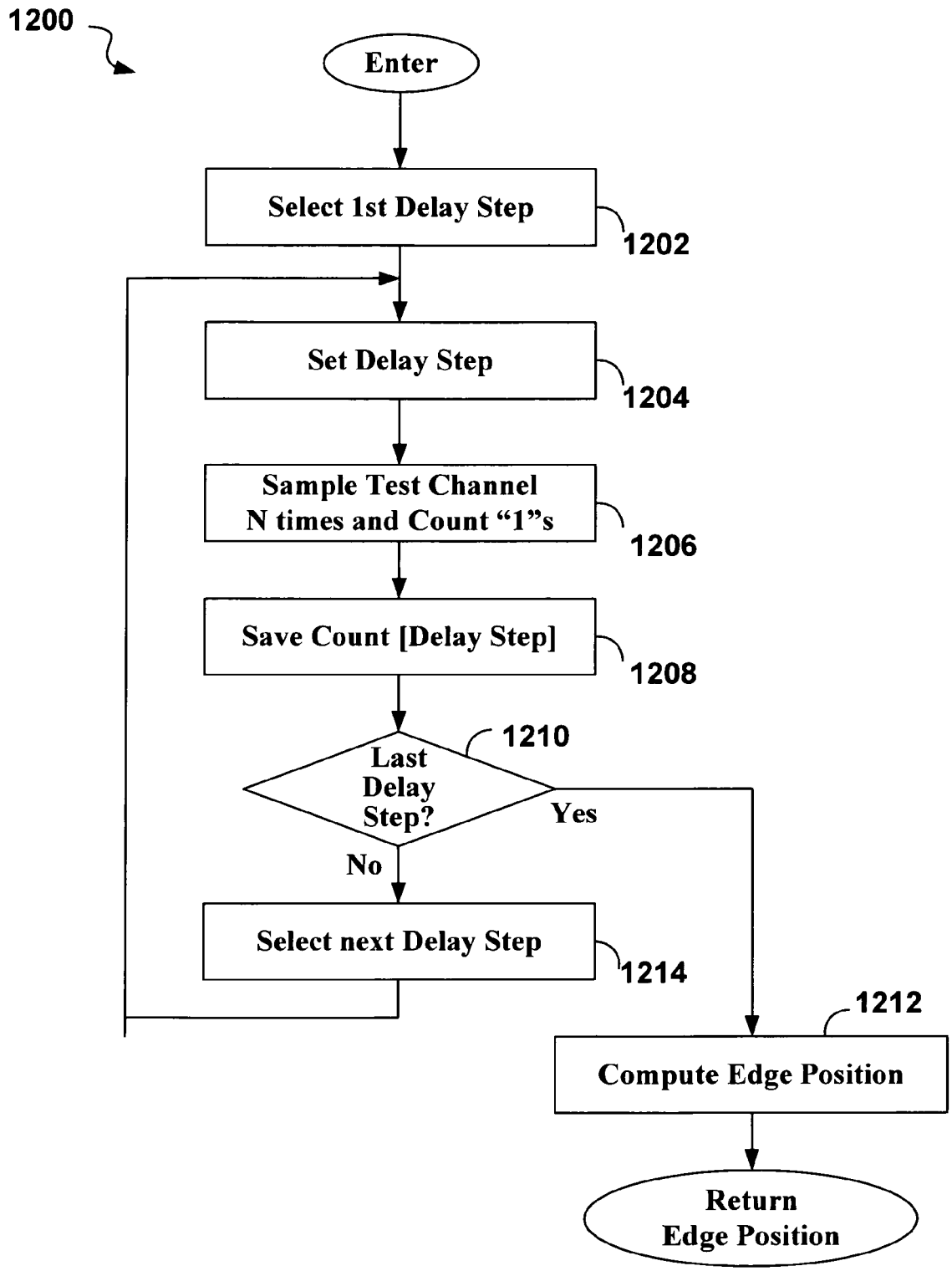
FIG. 15 shows a flowchart of a Channel Test 1200 which is an expansion of each of the steps 1104 "Run Channel Test and Get T1 "and 1108" Run Channel Test and Get T2" of FIG. 14.

FIG. 15 shows a flowchart of a Channel Test 1200 which is an expansion of each of the steps 1104 "Run Channel Test and Get T1" and 1108 "Run Channel Test and Get T2" of FIG. 14, including steps:

1202: "Select first Delay Step";
1204: "Set Delay Step";
1206: "Sample Test Channel N times and Count 1s";
1208: "Save Count [Delay Step]";
1210: determine if the current Delay Step is the "Last Delay Step?";
1212: "Compute Edge Position"; and
1214: "Select next delay Step".

In the Channel Test 1200, the position of an edge of the received single "1" bit 816 is determined as follows:

the Delay Step Counter 702 (FIG. 9) is initialized to a first delay step in the step 1202 "Select first Delay Step";

the delay of the Programmable Delay 710 is set by the Delay Step Counter 702 in the step 1204 "Set Delay Step";

in the step 1206 "Sample Test Channel N times and Count 1s", the received test pattern 806 is sampled with the delayed sampling pulse 714 of the Programmable Delay 710, in the sampling flip flop 718. A plurality of N samples are obtained in N consecutive cycles of the test pattern (the pattern length is counted off in the Pattern Length Counter 708), and for each of the N cycles the Ones-Counter 720 is incremented if the sample is a logic "1";

after N samples have been collected as determined in the N-Counter 704, the count of "1"s that has been accumulated in the Ones-Counter 720, is stored in the Memory 706 at an address indexed by the delay step, in the step 1208 "Save Count [Delay Step]";

if it is determined next that all delay steps have been applied ("YES" from the step 1210 "Last Delay Step?") the edge position is computed from the "1"s counts that was obtained with each delay step and are located in the Memory 706. Otherwise ("NO" from the step 1210 "Last Delay Step?") the next delay step is selected by incrementing the Delay Step Counter 702 in the step 1214 "Select next delay Step".

The computation of the edge position is preferably carried out by the Calibration Control 514 (FIGS. 7 and 8) of the Calibration Fixture 504 which accesses the Memory 706 through the link 516 and the I²C interface 630 (FIGS. 8 and 9).

The embodiment of the present invention has the following advantages over the existing methods used in prior art. It provides a self calibrating method for boosted HDMI cables without the need for external high speed test equipment as the test pattern generation and detection is built into the boost device while a simple control circuit, implemented in a micro controller or an FPGA is sufficient to direct the calibration process over the relatively low-speed I²C bus that is part of the HDMI specification. Thus significant economies are gained.

Although the embodiment of the invention has been described with regard to a boosted HDMI cable, boosted high speed cables according to other standards may equally benefit from the invention.

Although the embodiment of the invention has been described in detail, it will be apparent to one skilled in the art that variations and modifications to the embodiment may be made within the scope of the following claims.

What is claimed is:

1. A method for calibrating a high speed cable having boost device embedded in the cable, the cable carrying a plurality of high speed channels and a low speed control bus, the cable including an input connector and an output connector, the method comprising:
   (a) looping the high speed channels from the output connector to the input connector;
   (b) selecting a test channel from among the high speed channels;
   (c) selecting a sampling channel from among the remaining high speed channels; and
   (d) calibrating the test channel using the sampling channel:
   wherein the step (d) comprises:
   (f) selecting and setting a parameter set of the boost device;
   (g) testing the test channel with the selected parameter set to obtain a pulse width error indicative of the performance of the boost device;
   (h) selecting a different parameter set; and
   (i) repeating the steps (g) and (h) until the pulse width error is minimized.

2. The method of claim 1, further comprising repeating the steps (b) to (d) until all high speed channels are calibrated.

3. The method of claim 1, wherein the step (g) comprises:
   (j) sending a repetitive test pattern including a transmitted pulse having a transmitted pulse width over the test channel;
   (k) sending a repetitive sampling pattern synchronized with the repetitive test pattern over the sampling channel;
   (l) receiving a received test pattern and a received sampling pattern through the looped cable from the test channel and the sampling channel respectively;
   (m) sampling the received test pattern with the received sampling pattern to obtain respective times of rising and falling edges of a received pulse of the received test pattern, the received pulse being a single bit of the received test pattern;
   (n) determining a received pulse width from the respective times of the rising and falling edges of the received pulse;
   (o) comparing the received pulse width with the transmitted pulse width to determine the pulse width error.

4. The method of claim 3, wherein the step (o) comprises determining the pulse width error as the absolute difference between the received pulse width and the transmitted pulse width.

5. The method of claim 3, wherein the step (m) comprises:
   (p) delaying the received sampling pattern by a programmable delay to obtain a delayed sampling pulse;
   (q) sampling the received test pattern with the delayed sampling pulse N times to yield binary samples;
   (r) counting binary samples, having a predetermined value, over a period of time;
   (s) saving the count of the counted binary samples and the delay in a memory;
   (t) repeating the steps (p) to (s) for different delays;

(u) determining respective times of the rising and the falling edges from the saved delays and the saved binary sample counts.

6. The method of claim 5, wherein the step (r) comprises counting the binary samples having the value of "1".

7. The method of claim 5, wherein the step (r) comprises counting the binary samples having the value of "0".

8. The method of claim 1, wherein the step (b) comprises:
coupling a data pattern generator to the test channel through a first multiplexer;
generating a data pattern in the data pattern generator; and
sending the data pattern on the test channel to the output connector.

9. The method of claim 8, wherein the step (c) comprises:
coupling a sampling pattern generator to the sampling channel through a second multiplexer;
generating a sampling pattern in the sampling pattern generator; and
sending the sampling pattern on the sampling channel to the output connector.

10. The method of claim 9, wherein the step (a) further comprises coupling each of the high speed channels from the input connector through wires of the high speed cable to an input of a respective programmable boost circuits.

11. The method of claim 10, wherein the step (d) comprises:
(1) programming a delay of a first programmable boost circuit associated with the test channel;
(2) receiving the test channel carrying the test pattern at the first programmable boost circuit;
(3) receiving the sampling channel carrying the sampling pattern at a second programmable boost circuit associated with the sampling channel;
(4) sampling an output of the first programmable boost circuit with an output of the second programmable boost circuit to determine a signal quality of the test pattern of the received test channel; and
(5) repeating steps (1) to (4) with different delays until a satisfactory signal quality is achieved, thereby calibrating the test channel.

12. The method of claim 11, further comprising repeating the steps (b) to (d) until all high speed channels are calibrated.

13. The method of claim 1, wherein the step (d) further comprises: estimating a position in time of a pulse edge of a signal on the test channel, comprising:
(1) delaying a sampling pulse sent through the sampling channel by a delay to obtain a delayed sampling pulse;
(2) sampling the signal on the test channel with the delayed sampling pulse N times to yield binary samples of the signal on the test channel;
(3) counting binary samples, having a predetermined value, over a period of time;
(4) saving the count of the counted binary samples and the delay in a memory;
(5) repeating the steps (1) to (4) for different delays;
(6) computing the position in time of the pulse edge from the saved delays and the saved sample counts.

14. The method of claim 13, wherein the step (3) comprises counting the binary samples having the value of "1".

15. The method of claim 14, wherein the step (3) comprises counting the binary samples having the value of "0".

16. The method of claim 1, wherein the high speed cable is a High-Definition Multimedia Interface (HDMI) cable.

17. A system for calibrating a high speed cable, carrying a plurality of high speed channels and a low speed control bus, the cable having an input connector and an output connector, the system comprising:

a calibration fixture for looping the high speed channels from the output connector to the input connector;
a boost device embedded in the cable, the boost device comprising:
a first means for selecting a test channel from among the high speed channels;
a second means for selecting a sampling channel from among the remaining high speed channels; and
a calibration circuit for calibrating the test channel using the sampling channel, the calibration circuit being operatively coupled to the low speed control bus;
the system further comprising a calibration control device operatively coupled to the cable through the low speed control bus;
wherein the calibration control device has a field-programmable gate array (FPGA), or a digital processor having a memory storing instructions for performing the following:
(f) selecting and setting a parameter set of the boost device;
(g) receiving results of testing the test channel with the selected parameter set to obtain a pulse width error indicative of the performance of the boost device;
(h) selecting a different parameter set; and
(i) repeating the steps (g) and (h) until the pulse width error is minimized.

18. The system of claim 17, wherein the calibration circuit comprises:
a sampling circuit for sampling the test channel with the sampling channel;
a parameter memory for storing programmable parameters of the boost device; and
a sampling control circuit for monitoring the sampling circuit and for setting the programmable parameters in the parameter memory.

19. The system of claim 17, wherein the boost device comprises a plurality of channel circuits, each channel circuit including a programmable boost circuit for boosting a corresponding one of the high speed channels, the programmable boost circuit being responsive to programmable parameters of the boost device stored in a parameter memory.

20. The system of claim 19, wherein:
each channel circuit further comprises a pattern generator; and
the boost device further comprises a low speed control bus interface, interfacing the low speed control bus for controlling the pattern generator of each channel circuit.

21. The system of claim 20, wherein:
the first means further comprises a first multiplexer coupled to the pattern generator of the channel circuit of the test channel for sending a test pattern on the test channel; and
the second means further comprises a second multiplexer coupled to the pattern generator of the channel circuit of the sampling channel for sending a sampling pattern on the sampling channel.

22. The system of claim 19, wherein:
the first means comprises a data tap coupled to an output of the programmable boost circuit boosting the test channel; and
the second means comprises a sampling tap coupled to an output of the programmable boost circuit boosting the sampling channel.

23. The system of claim 22, wherein:
(i) the sampling circuit comprises:
a programmable delay for delaying an output of the sampling tap;

a sampling circuit element for generating binary samples from an output of the data tap clocked with the delayed output of the sampling tap;

a means for determining an average of N generated binary samples, which have a predetermined value; and (ii) the sampling control circuit comprises a means for varying the programmable delay in predetermined delay steps.

24. The system of claim 22, wherein the sampling control circuit further comprises a memory for storing some or all of the delay steps and corresponding averages.

25. The system of claim 17, wherein the calibration control device comprises means for interpolating between averages obtained by varying the programmable delay in the predetermined delay steps.

26. The system of claim 17, wherein the calibration control device is a micro controller.

27. The system of claim 17, wherein the calibration control device is a field programmable array.

28. The system of claim 17, wherein the high speed cable is a High-Definition Multimedia Interface (HDMI) cable.

29. A self-calibrating high speed cable, carrying a plurality of high speed channels and a low speed control bus; the cable having an input connector and an output connector, the cable comprising:

a boost device embedded in the cable; the boost device comprising:

a first means for selecting a test channel from among the high speed channels;

a second means for selecting a sampling channel from among the remaining high speed channels; and a calibration circuit for calibrating the test channel using the sampling channel, the calibration circuit being operatively coupled to the low speed control bus;

the cable is configured to be operably coupled through the low speed control bus to a calibration fixture for looping the high speed channels from the output connector to the input connector, and to a calibration control device having a field-programmable gate array (FPGA), or a digital processor having a memory storing instructions for performing the following:

(f) selecting and setting a parameter set of the boost device;

(g) receiving results of testing the test channel with the selected parameter set to obtain a pulse width error indicative of the performance of the boost device;

(h) selecting a different parameter set; and (i) repeating the steps (g) and (h) until the pulse width error is minimized.

30. The cable of claim 29, wherein the calibration circuit comprises:

a sampling circuit for sampling the test channel with the sampling channel;

a parameter memory for storing programmable parameters of the boost device; and a sampling control circuit for monitoring the sampling circuit and for setting the programmable parameters in the parameter memory.

31. The cable of claim 29, wherein the boost device comprises a plurality of channel circuits, each channel circuit including a programmable boost circuit for boosting a corresponding one of the high speed channels, the programmable boost circuit being responsive to programmable parameters of the boost device stored in a parameter memory.

32. The cable of claim 31, wherein:

each channel circuit further comprises a pattern generator; and the boost device further comprises a low speed control bus interface, interfacing the low speed control bus for controlling the pattern generator of each channel circuit.

33. The cable of claim 32, wherein:

the first means further comprises a first multiplexer coupled to the pattern generator of the channel circuit of the test channel for sending a test pattern on the test channel; and the second means further comprises a second multiplexer coupled to the pattern generator of the channel circuit of the sampling channel for sending a sampling pattern on the sampling channel.

34. The cable of claim 31, wherein:

the first means comprises a data tap coupled to an output of the programmable boost circuit boosting the test channel; and the second means comprises a sampling tap coupled to an output of the programmable boost circuit boosting the sampling channel.

35. The cable of claim 34, wherein:

(i) the sampling circuit comprises:

a programmable delay for delaying an output of the sampling tap;

a sampling circuit element for generating binary samples from an output of the data tap clocked with the delayed output of the sampling tap;

a means for determining an average of N generated binary samples, which have a predetermined value; and (ii) the sampling control circuit comprises a means for varying the programmable delay in predetermined delay steps.

36. The cable of claim 35, wherein the sampling control circuit further comprises a memory for storing some or all of the delay steps and corresponding averages.

37. The cable of claim 29, wherein the high speed cable is a High-Definition Multimedia Interface (HDMI) cable.

* * * * *